United States Patent [19]
Dennis

[11] Patent Number: 5,127,104
[45] Date of Patent: Jun. 30, 1992

[54] METHOD AND PRODUCT INVOLVING TRANSLATION AND EXECUTION OF PROGRAMS BY AUTOMATIC PARTITIONING AND DATA STRUCTURE ALLOCATION

[75] Inventor: Jack B. Dennis, Belmont, Mass.

[73] Assignee: Dataflow Computer Corporation, Boston, Mass.

[21] Appl. No.: 947,230

[22] Filed: Dec. 29, 1986

[51] Int. Cl.⁵ .............................................. G06F 9/15
[52] U.S. Cl. .................................. 395/650; 364/973; 364/230.4; 364/230.5
[58] Field of Search ................. 364/200 MS File, 300, 364/900 MS File

[56] References Cited

U.S. PATENT DOCUMENTS

| | | | |
|---|---|---|---|
| 3,962,706 | 6/1976 | Dennis et al. | 364/900 |
| 3,978,452 | 8/1976 | Barton et al. | 364/200 |
| 4,112,489 | 9/1978 | Wood | 364/200 |
| 4,128,882 | 12/1978 | Dennis | 364/200 |
| 4,130,885 | 12/1978 | Dennis | 364/900 |
| 4,145,733 | 3/1979 | Misunas et al. | 364/200 |
| 4,149,240 | 4/1979 | Misunas et al. | 364/200 |
| 4,153,932 | 5/1979 | Dennis et al. | 364/200 |
| 4,156,903 | 5/1979 | Barton et al. | 364/200 |
| 4,156,908 | 5/1979 | Missios et al. | 364/200 |
| 4,156,909 | 5/1979 | Barton et al. | 364/200 |
| 4,156,910 | 5/1979 | Barton et al. | 364/200 |
| 4,187,539 | 2/1980 | Eaton | 364/200 |
| 4,236,206 | 11/1980 | Strecker et al. | 364/200 |
| 4,245,299 | 1/1981 | Woods et al. | 364/200 |
| 4,251,861 | 2/1981 | Mago | 364/200 |
| 4,254,476 | 3/1981 | Burrows | 364/513 |
| 4,271,480 | 6/1981 | Vinot | 364/900 |
| 4,390,969 | 6/1983 | Hayes | 364/900 |
| 4,447,875 | 5/1984 | Bolton et al. | 364/200 |
| 4,467,409 | 8/1984 | Potash et al. | 364/200 |
| 4,468,736 | 8/1984 | DeSantis et al. | 364/200 |
| 4,475,156 | 10/1984 | Frederico et al. | 364/300 |
| 4,502,118 | 2/1985 | Hagenmaier, Jr. et al. | 364/200 |
| 4,667,290 | 5/1987 | Goss et al. | 364/300 |
| 4,692,896 | 9/1987 | Sakoda et al. | 364/900 |
| 4,763,255 | 8/1988 | Hopkins et al. | 364/200 |
| 4,802,091 | 1/1989 | Cocke et al. | 364/200 |
| 4,825,360 | 4/1989 | Knight, Jr. | 364/200 |
| 4,847,755 | 7/1989 | Morrison et al. | 364/200 |
| 4,885,684 | 12/1989 | Austin et al. | 364/200 |

FOREIGN PATENT DOCUMENTS

| | | |
|---|---|---|
| 1449542 | 1/1969 | Fed. Rep. of Germany . |
| 1074776 | 1/1976 | Japan . |
| 1029571 | 5/1966 | United Kingdom . |
| 1115765 | 5/1968 | United Kingdom . |
| 1314393 | 4/1973 | United Kingdom . |
| 1442459 | 7/1976 | United Kingdom . |

OTHER PUBLICATIONS

Adams III et al., "Report on an Evaluation Study of Data Flow Computation", *Research Inst. for Advanced Comp. Science*, Apr. 1985, entire document.

"Functional Languages and Architecture", *Progress Report for 1983-84*, Arvind et al., Dec. 8, 1984, entire document.

Ackerman, W. B. *Data Flow Languages*, MIT CSG memo 177-1 M.I.T., Cambridge, Mass. CSG memo 177-1, May 1979.

Ackerman, W., Bauman, N., Woodhall, B., *Static Data Flow Cell Block*, M.I.T. CSG Memo 232, Nov. 4, 1983.

Ackerman, W. B., *The VAL Intermediate Graph Format*, M.I.T. CSG Memo 235, Jan. 12, 1984.

(List continued on next page.)

*Primary Examiner*—Stuart N. Hecker
*Assistant Examiner*—Rebecca L. Rudolph
*Attorney, Agent, or Firm*—Gerald Altman

[57] ABSTRACT

In a computer, a machine code program is run by a succession of assignments of groups of replicated code-blocks to groups of memory locations for a succession of executions by groups of processing elements, the code-block replications being determined in relation to data structure definitions and the succession of executions being determined in relation to the succession of assignments.

25 Claims, 22 Drawing Sheets

OTHER PUBLICATIONS

Adams, G. B., III, et al, *Report on an Evaluation Study of Data Flow Computation,* Research Inst. for Advanced Computer Science, NASA, Apr. 1, 1985.

Arvind, Kathail, V., A Multiple Processor Dataflow Machine, MIT CGS Memo 205-1, Feb., 1981.

Arvind, *Functional Languages and Architecture,* Progress Report for 1983-84, M.I.T. Dec. 8, 1984.

Arvind, Ianucci, R. A., *Two Fundamental Issues in Multiprocessing the Dataflow Solution,* M.I.T. CSG Memo 226-2, Jul. 27, 1983.

Tam-Auh Chu, *The Design, Implementation and Testing of a Self-Timed Two by Two Packet Router,* M.I.T. CSG Memo 236, Feb., 1983.

Dennis, J. B., *Dataflow Ideas for Superconducters,* Proceedings of the Comp Con '84, 28th IEEE Computer Soc. Int., Feb. 27-Mar. 1, 1984.

Dennis, J. B., *Progress Report 1979-80,* MIT CSG Memo 203 Feb. 1981.

Dennis, J. B. *Data Flow Supercomputers* M.I.T. Cambridge, Mass.. Nov. 1980, Computer, pp. 48-56.

Dennis, J. B. *High Performance Dataflow Computers* M.I.T. Cambridge, Mass. CSG Memo 215, Mar. 1982.

Dennis, J. B. et al *The MIT Dataflow Engineering Model,* M.I.T. Cambridge, Mass. CSG Memo 222 Nov. 1982.

Dennis, J. B., *Data Flow Models of Computation,* International Summer School on Control Flow and Dataflow; Markteberdorf, Germany, Aug. 1984.

Dennis, J. B., Rong, Gao Guang, *Maximum Pipelining of Array Operation on Static Data Flow Machine,* M.I.T. CSG Memo 233 Sep. 1984.

Dennis, J. B., *An Operational Semantics for a Language with Early Completion Data Structures,* MIT CSG Memo 207, Nov. 23, 1984.

Dennis, J. B., *Computational Structures Progress Report for 1983-1984,* M.I.T. CSG Memo 246, Feb. 28, 1985.

Gao, G. R., *A Maximally Pipelined Tridiagonal Linear Equation Solver,* M.I.T. CSG Memo 254, Jun., 1985.

McGraw, J. R. *Data Flow Computing—The VAL Language* M.I.T. Cambridge, Mass. CSG Memo 188, Jan. 1980.

Montz, Li, *Safety & Optimization Transformations for Dataflow Programs,* M.I.T., Jan., 1980.

NEC Electronics, Inc., µPD7281 *Image Pipelined Processor,* Feb. 1985.

Plas, A., et al, *Lau System Architecture: A Parallel Data Driven Processor Based on Single Assignment,* Univ. de Toulouse, France, Aug. 8, 1976.

Rodriguez, J. E. *A Graph Model for Parallel Computations,* M.I.T., Laboratory for Computer Science, Sep., 1969.

Rumbaugh, J. E. *A Parallel Asynchronous Computer Architectue for Data Flow Programs* M.I.T. Cambridge, Mass. May 1975.

Vedder, R. et al, The Hughes Data Flow Multiprocessor, Hughes Aircraft Co., Box 902, El Segundo, CA, 1985, *IEEE*

Ackerman, W. B., Dennis, J. B. *VAL—A Value Oriented Algorithmic Language.* M.I.T. Cambridge, MA, Jun. 1979.

Cornish, M. *The II Data Flow Architectures: The Power of Concurrency for Avionics,* Dataflow Dev. Group of Texas Instruments, Inc. Austin, Texas, Nov. 1979.

Dennis, J. B. Stoy, J. E., Guhardy, B., *VIM: An Experimental Multiuser System Supporting Functional Programming* M.I.T. Cambridge, MA, May 1984.

Dennis, J. B., Misunas, D. P., *A Preliminary Architecture for a Basic Dataflow Processor,* M.I.T., Cambridge, MA, Aug. 1974.

Gao, G. R.—*An Implementation Scheme for Array Operations in Static Data Flow Computers* M.I.T. Cambridge, MA, May 1982.

Gostelow, A. & Gostelow, K. P., *A Computer Capable of Exchanging Processors for Time,* University of California, Irvine, Calif.—1977.

Gurd, J. R., Kirkham, C. C., Watson, I. *The Manchester Prototype Dataflow Computer* Communications of the ACM, vol. 28, No. 1, Jan. 1985, pp. 34-52.

Patil, S. S., *Closure Properties of Interconnections of Determinate Systems,* M.I.T. Cambridge, MA, 1970.

Van Horn, E. C. *Computer Design for Asynchronously Reproducible Multiprocessing,* M.I.T. Camb. MA, Nov. 1966.

Watson, I. & Gurd, J. *A Practical Dataflow Computer* University of Manchester, Manchester, England, *IEE Computer* Feb. 1982.

Yuba, T. Shimada, T. Hiraki, K. and Kashiwagi, H. *A Dataflow Computer for Scientific Computations* Electrotechnical Laboratories, 1-1-4 Umesono, Sakauramura, Niiharigun, Ibaraki 305, Japan-1984.

R. T. Hood and K. Kennedy. Programming Language (List continued on next page.)

OTHER PUBLICATIONS

Support for Supercomputers. In *Frontiers of Supercomputing*, N. Metropolis, D. H. Sharp, W. J. Worton, K. R. Ames, Eds. (Berkeley: University of California Press, 1986), pp. 282-311.

K. Kennedy, A Survey of Data Flow Analysis Techniques. In *Program Flow Analysis: Theory and Applications*, S. S. Machnick and N. D. Jones, Eds. (New Jersey: Prentice-Hall, 1981), pp. 1-54.

M. L. Welcome and S. K. Skedzielewski. Dataflow graph optimization in IF1. In *Lecture Notes in Computer Science* 201: *Functional Programming Languages and Computer Architecture*, (Berlin, Heidelberg, New York; Springer-Verlag 1985), pp. 17-34.

V. Sakar and J. Hennessy, Compile-time partitioning and Scheduling of parallel programs. In *SIGPLAN Notices* 21 (Jul. 1986): *Proceedings of the SIGPLAN '86 Symposium on Computer Construction*, pp. 17-26, 1986.

Dennis Gannon. "Restructuring Nested Loops on the Alliaut Cedar Cluster: A Case Study of Gaussian Elimination of Bonded Matrices". Center for Supercomputing Research and Development, U. of Illinois, Urbana--Champaign, 1986 pp. 1-14.

R. Cytron. *Compile-Time Scheduling and Optimization for Asynchronous Machines*, Ph.D. Thesis, University of Illinois, Urbana-Champaign, Aug. 1984, pp. 1-168.

Kenneth Kennedy, "Automatic translation of Fortran programs to vector form". Rice Technical Report 476-029-4, Rice University, Oct. 1980.

D. J. Kuck, R. H. Kuhn, B. Leasure, D. H. Padua, and M. Wolfe, Dependence graphs and compiler optimizations. *Conference Record of Eighth Annual ACM Symposium on Principles of Programming Languages*. Williamsburg. VA, Jan. 1981.

Allen, F. E. and Cocke, J. A catalogue of optimizing transformations in *Design and Optimization of Compilers*, R. Rustin, Ed. Prentice-Hall, Engelwood Cliffs, N.J., 1972, pp. 1-30.

Allen, F. E., Carter, J. L., Fabri, J., Ferrante, J. Harrison, W. H. Loewner, P. G., and Trevillyan, L. H., "The experimental compiling system". IBM J. Res. Dev. 24, 6 (Nov. 1980), 695-715.

Allen, J. R., and Kennedy, K. "Automatic loop interchange". In *Proceedings of the ACM SIGPLAN by Symposium on Compiler Construction* (Montreal, Jun. 17-22). ACM, New York, 1984, pp. 223-246.

Banerjee, U. "A Direct parallelization of call statements—A review". Rep. 576, Center for Supercomputing Research and Development, Univ. of Illinois at Urbana-Champaign, Nov. 1985.

Brode, B. "Precompilation of Fortran programs to facilitate array processing". *IEEE Computer* 14, 9 (Sep. 1981), 46-51.

Cytron, R. G. "Doacross; Beyond vectorization for multiprocessors". In *Proceedings of the 1986 Conference on Parallel Processing* (St. Charles, Ill., Aug. 19-22). IEEE Press, New York, 1986, pp. 836-844.

Davies, J., Huson, C., Macke, T., Leasure, B., and Wolfe, M. "The KAP/S-1: An advanced source-to-source vectorizer for the S-1 Mark IIa supercomputer". In *Proceedings of the 1986 International Conference on Parallel Processing* (St. Charles, Ill., Aug. (9-22). IEEE Press, New York, 1986, pp. 833-835.

Davies, J., Huson, C., Macke, T., Leasure, B., and Wolfe, M. "The KAP/205: An advanced source-to-source vectorizer for the Cyber 205 supercomputer". In *Proceedings of the 1986 International Conference on Parallel Processing* (St. Charles, Ill., Aug. 19-22). IEEE Press, New York, 1986, pp. 827-832.

Kildall, G. A. "A unified approach to global program optimization". In *Conference Record of the 1st ACM Symposium on Principles of Programming Languages* (POPL) (Boston, MA., Oct. 1-3). ACM, New York, 1973, pp. 194-206.

Kuck, D. J., Kuhn, R. H., Padua, D. A., Leasure, B., and Wolfe, M. "Dependence graphs and compiler optimizations". In *Proceedings of the 8th ACM Symposium on Principles of Programming Languages* (POPL) (Williamsburg, Va., Jan. 26-28). 1981, pp. 207-218.

Loveman, D. B. "Program improvement by source-to-source transformation". J. ACM 24, 1 (Jan. 1977), 121-145.

Polychronopoulos, C. D. "Program restructuring, scheduling, and communication for parallel processor systems". Ph.D. thesis, Rep. 595, Center for Supercomputing Research and Development, U. of Illinois at Urbana-Champaign, 1966.

Allen, J. R. & Kennedy, K. PFC: A Program to Convert Fortran to Parallel Form. *The Proceedings of the IBM Conference on Parallel Computers and Scientific Computations*, Mar., 1982, pp. 1-63.

Campbell, M. L. "Static Allocation for a Dataflow Multiprocessor", Proc. 1985 Int. Conf. Parallel Processing, 1985, pp. 511-517.

Fisher, J. A. et al, "Parallel Processing: A Smart Compiler and a Dumb Machine". *SIGPLAN Notices* 19, 6 (Jun. 1984), pp. 37-47.

Kuck, D. J., Kuhn, R. H., Leasure, B., and Wolfe, M. "The Structure of an Advanced Vectorizer for Pipelined Processors". *Proceedings of the IEEE Computer Society, Fourth International Computer Software and Applications Conference*, IEEE (Oct. 1980), pp. 709-715.

```
function Quadratic (
    a, b, c:  real)
    returns (complex, complex)
    type complex = record [re, im: real];
    let D : = b * b - 4.0 * a * c;
        Y : = 1 / (2.0 * a);
    in if D ≥ 0.0
        then
            let X : = SqRt (D)
            in record [re:  (-b + X) * Y; im: 0.0],
               record [re:  (-b - X) * Y; im: 0.0]
            endlet
        else
            let X : = SqRt (-D)
            in record [re: -b * Y; im: X * Y],
               record [re: -b * Y; im: -X * Y]
            endlet
        endif
    endlet
endfun
```

The Quadratic Formula Written In Val

FIG. 3

```
function Smooth(
    Q: Grid;      % state values
    S: Grid:      % residuals
    D: Grid:      % Jacobian
    smu: real:    % smoothing parameter
    n: integer    % grid size
    returns Grid) % smoothed data
    type Grid = array[array[array[real]]]:
    let
        sm1: real : = .5 * smu;
    in
        forall j in [1, n], k in [1, n], l in [1, n]
        construct
            if j = 1  k = 1  l = 1  j = n  k = n  l = n
            then  % boundary point -- no change
                S[j, k, l]
            elseif j = 2  j = n - 1
            then  % point is next to boundary in j-direction
                  % -- use second order formula
                S[j, k, l] + sm1 * (
                    + Q[j + 1, k, l] * D[j + 1, k, l]
                    - 2.0 * Q[j, k, l] * D[j, k, l]
                    + Q[j - 1, k, l] * D[j - 1, k, l]
                ) / D[j, k, l]
            else  % interior point - - use fourth order formula
                S[j, k, l] - smu * (
                    + Q[j + 2, k, l] * D[j + 2, k, l]
                    - 4.0 * Q[j + 1, k, l] * D[j + 1, k, l]
                    + 6.0 * Q[j, k, l] * D[j, k, l]
                    - 4.0 * Q[j - 1, k, l] * D[j - 1, k, l]
                    + Q[j - 2, k, l] * D[j - 2, k, l]
                ) / D[j, k, l]
            endif
        endall;
    endlet
endfun
```

FIG. 8

Smooth

> ForAll
> index ranges
> j: [1..n]
> k: [1..n]
> l: [1..n]
> operations
> ±: $4n^3 - 28n^2 + 64n$
>   : $3n^3 - 20n^2 + 44n$
>   : $n^3 - 6n^2 + 12n$
> inputs/skew
>
>        j   k   l
> S:re  0   0   0
> Q:re  ±2  0   0
> D:re  0   0   0
> result type re
> depth = 5 body

> SubRange
> arm subranges
>
> | j | k | l | arm |
> |---|---|---|---|
> | 1 | • | • | 1 |
> | n | • | • | 1 |
> | • | [1] | • | 1 |
> | • | [n] | • | 1 |
> | • | • | [1] | 1 |
> | • | • | [n] | 1 |
> | [2] | • | • | 2 |
> | [n-1] | • | • | 2 |
> | [3..n-2] | • | • | 3 |
>
> arms: 1● ; 2:● ; 3:●
>         ↓      ↓      ↓
>         A1   A2   A3

FIG. 10

```
function AeroSim (
    n: integer;          % Grid size
    p: integer;          % Time steps to be performed
    Parms: Parameters;   % Miscelaneous parameters
    returns GridMap, Data )

type Grid = array[array[array[real]]];
    type Data = array[Grid];
    type GridMap = record[x, y, z: Grid]

% Initialization
    let

% Generate grid
        G0: GridMap := DefineGrid (n, Parms) ;

% Compute Jacobian of the grid
        D: Grid := Jacob(G, n, Parms) ;

% Set grid data for initial conditions
        Q0: Data := InitialData ( n, Parms )

% The main iteration
        Q1, Gf :=
            for r, Gi, Qi := 1, G, Q
            do
                if r > p then Gi, Qi
                else
                    let
                        Gn, Qn := Step (Q0, G0, D, p, n, Parms)
                    in
                        iter
                            r, Gi, Qi := r+1, Gn, Qn
                        enditer
                    endlet
                endif
            endfor ;

% Unscale by jacobian
        Qf: Data := Unscale (Q1, D)

in Gf, Qf
    endlet
endfun
```

FIG. 13

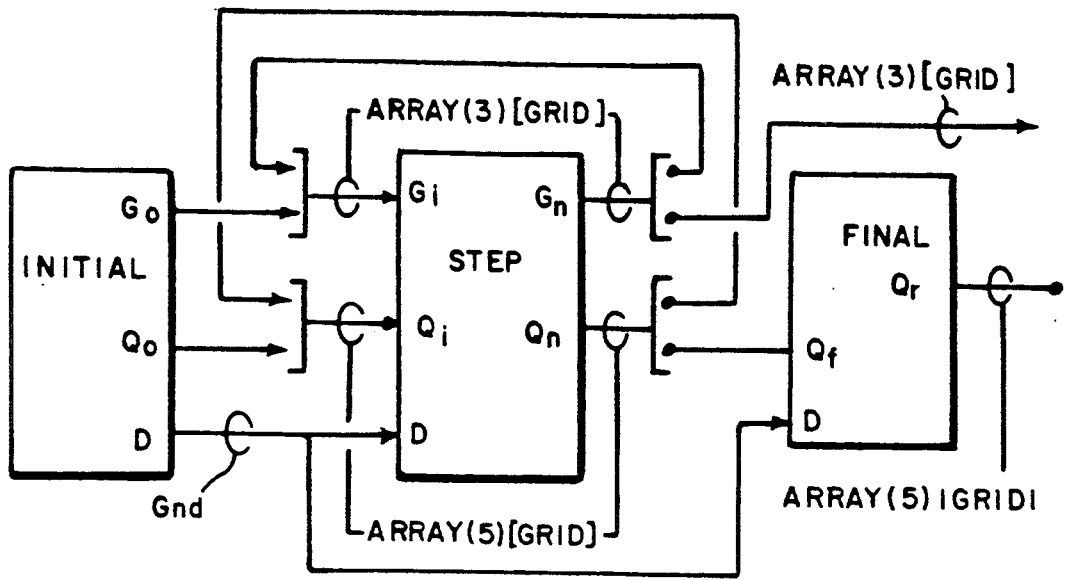

FIG. 14

```
function Step (
        Q: Data ;           % Grid data
        GO: Gridmap ;       % Grid map
        D: Grid ;           % Jacobian
        Parms: Parameters;  % Problem parameters
    returns
        Gridmap,            % final gridmap
        Data )              % final Q
let % Modify gridmap to reflect rotation of body
    Gn := Spin ( Gi, n, Parms)

% Boundary Values of Q
    Q1 := BoundaryConditions ( Gn, Qi, n, Parms) ;

% Compute Right Hand Side
    S0 := RightHandSide (Gn, Q1, n, Parms) ;

% Smooth
    S1 := Smooth (S0, Q1, n, Parms) ;

% Implicit Integration
    S2 := XPass (S1, Q1, Gn, n, Parms) ;
    S3 := YPass (S2, Q1, Gn, n, Parms) ;
    Sn := ZPass (S3, Q1, Gn, n, Parms) ;

in Sn endlet
endfun
```

FIG. 15

```
function XPass (
    G: GridMap ;    % Grid map
    S: Data ;       %
    Q: Data ;       %
    D: Grid :       % Jacobian
    n: integer ;    %
    Parms: Parameters
returns
    Data)           % new Q let
    X :=
        forall k in [2, n-1], 1 in [2, n-1]
            H: Grid :=
                forall j in [1, n]
                    Xmet := XM ( (G, D, j,k,1, n, Parms )
                construct
                    AMat ( Q[j,k,1], Xmet, n, Parms )
                endall ;

A, B, C :=
                forall j in [2, n-1]
                construct
                    ABCSet (H[j-1], H[j+1], D[j,k,1], D[j-1,k,1], D[j+1,k,1],
                        Parms)
                endall ;

F :=
                forall j in [2, n-1]
                construct SS[j,k,1]
                endall ;

construct Solve (B,C,A,F,n)
        endall ;

in
    forall j in [2, n-1]
    construct S[j,k,1] + X[j,k,1]
    endall ;
endlet
endfun
```

FIG. 17

Program AeroSim

| Phase | Adds | Multiplies | Divides | Depth | Data Generated |
|---|---|---|---|---|---|
| Spin | $2n^3$ | $4n^3$ | 0 | 2 | $n^3$ |
| BC | $447n^2$ | $496n^2$ | $38n^2$ | $105 + 18 \log_2 n$ | $6n^2$ |
| RHS | $59n^3$ | $105n^3$ | 0 | 23 | $20n^3$ |
| Smooth | $75n^3$ | $120n^3$ | $15n^3$ | $3 \times 7$ | $15n^3$ |
| XPass | $888n^3$ | $1064n^3$ | $11n^3$ | $18 + 70 \log_2 n$ | $5n^3$ |
| YPass | $888n^3$ | $1064n^3$ | $11n^3$ | $18 + 70 \log_2 n$ | $5n^3$ |
| ZPass | $888n^3$ | $1064n^3$ | $11n^3$ | $18 + 70 \log_2 n$ | $5n^3$ |
| Totals | $447n^2 + 2800n^3$ | $496n^2 + 3421n^3$ | $38n^2 + 48n^3$ | | $6n^2 + 51n^3$ |

XPass, YPass, ZPass:

| Component | Adds | Multiplies | Divides | Depth |
|---|---|---|---|---|
| XM | $7n^3$ | $13n^3$ | 0 | 9 |
| AMat | $21n^3$ | $56n^3$ | $n^3$ | 7 |
| ABCSet | $15n^3$ | $15n^3$ | 0 | 2 |
| Solve | $845n^3$ | $980n^3$ | $10n^3$ | $70 \log_2 n$ |
| Totals | $888n^3$ | $1064n^3$ | $11n^3$ | $18 + 70 \log_2 n$ |

FIG. 19

| Phase | Operations | Depth | Work Units | Copies | Efficiency ( % ) |
|---|---|---|---|---|---|
| Spin | $6n^3$ | 2 | $n^3$ | 1 X 256 | 100 |
| BC | $981n^3$ | $105 + 18\log_2 n$ | $n^3$ | (see text) | 14.4 |
| RHS | $164n^3$ | 23 | $n^3$ | 4 X 256 | 97.7 |
| Smooth | $210n^3$ | 3 X 8 | $n^3$ | 4 X 256 | 97.6 |
| XPass | $1963n^3$ | $18 + 70\log_2 n$ | $n^3$ | 1 | 95.2 |

METHOD AND PRODUCT INVOLVING TRANSLATION AND EXECUTION OF PROGRAMS BY AUTOMATIC PARTITIONING AND DATA STRUCTURE ALLOCATION

BACKGROUND OF THE INVENTION

1. Field of the Invention

The present invention relates to the efficient implementation of computations expressed in high-level programming languages on multiprocessor computers.

2. The Related Art

Compilers of various designs have been proposed for translating source programs in high level language to target programs in machine code or assembly language for execution by conventional sequential computers. Such compilers have been variously classified as single-pass, multi-pass, load-and-go, debugging, or optimizing--depending on their construction or function. In a typical optimizing compiler, for example, attention is focused on one program section at a time, and any change that improves the speed of execution of one section almost always yields an improvement in overall performance. Since the introduction of supercomputers that achieve high performance through the pipelining of vector operations, much effort has been devoted to so-called vectorizing compilers, compilers that identify sections of code that may be replaced by vector operations. These conventional compiling techniques are inadequate for producing efficient machine code programs for multiprocessor computers generally. The principles of the present invention are illustrated by way of example in reference to a dataflow multiprocessor. To achieve best performance on a multiprocessor, it is necessary to keep each processing element as fully occupied with useful computational work as possible. For this purpose, a global analysis of the source program is necessary.

The present invention introduces implementation techniques based on the global organization of data structure definitions in the source program. Key issues resolved in the invention are the partition of the computation into a time-sequence of phases, and the optimum allocation of code blocks, representing data structure values, to the processing elements and memories of a multiprocessor computer.

References

The present invention is an advance beyond certain earlier concepts, which are disclosed in the following U.S. Patents, and in which the present inventor is a joint or sole inventor:

1. U.S. Pat. No. 3,962,706, dated Jun. 8, 1976, for Data Processing Apparatus for Highly Parallel Execution of Stored Programs;
2. U.S. Pat. No. 4,128,882, dated Dec. 5, 1978, for Packet Memory System with Hierarchical Structure;
3. U.S. Pat. No. 4,130,885, dated Dec. 19, 1978, for Packet Memory System for Processing Many Independent Memory Transactions Concurrently;
4. U.S. Pat. No. 4,145,733, dated Mar. 20, 1979, for Data Processing Apparatus for Highly Parallel Execution of Stored Programs;
5. U.S. Pat. No. 4,149,240, dated Apr. 10, 1979, for Data Processing Apparatus for Highly Parallel Execution of Data Structure Operations; and
6. U.S. Pat. No. 4,153,932, dated May 8, 1979, for Data Processing Apparatus for Highly Parallel Execution of Stored Programs.

The following references also are cited as being relevant to the present invention. In these references, CGS and LCS refer respectively to the Computation Structures Group and the Laboratory for Computer Science at the Massachusetts Institute of Technology (MIT), 545 Technology Square, Cambridge, Massachusetts, U.S.A. 02139, where much of the work on dataflow technology has been done.

7. Ackerman, W.B. Data Flow Languages, Computer, IEEE, Feb., 1982. Previously appeared in Proc. of the 1979 Nat. Comp. Conf., Aug. 1979 and as CSG Memo 177, May 1979.
8. Ackerman, W.B. and Dennis, J.B. VAL--*A Value-oriented Algorithmic Language: Preliminary Reference Manual.* Report MIT/LCS/TR-218, LCS, Jun. 1978.
9. Adams, G.B., Brown R.L., and Denning, P.J. Report on an Evaluation Study of Data Flow Computation. Research Institute for Advanced Computer Science, Moffett Field, CA, Apr. 1985.
10. Agerwala, T. and Arvind, Eds. Special issue on Data Flow Systems. *Computer* 15,2, Feb. 1982.
11. Arvind, and K.P. Gostelow. A Computer Capable of Exchanging Processors for Time. Information Processing 77: Proceedings of IFIP Congress 77, Toronto, Canada, Aug. 1977, pp. 849–853.
12. Arvind and Kathail, V. A Multiple Processor Dataflow Machine That Supports Generalized Procedures. Proc. of the Eight Ann. Arch. Conf., May, 1981. Also published as CSG Memo 205-1, Jun. 1981.
13. Beam, R. and Warming, R.F. An Implicit finite-difference algorithm for hyperbolic systems in conservation-law-form. *J. Comp. Physics,* Sept. 1976.
14. Cornish, M., et al. The TI Data Flow Architectures: The Power of Concurrency for Avionics. Proceedings of the Third Digital Avionics Systems Conference, Nov. 1979, pp. 19–25.
15. Currie, I.G., *Fundamental Mechanics of Fluids.* McGraw-Hill, New York, 1974.
16. Davis, A.L., and Keller, R.M., "Dataflow Program Graphs. *Computer* 15, 2, Feb. 1982, 26–41.
17. Dennis, J.B. First Version of a Data Flow Procedure Language. In Programming Symposium, B. Robinet, Ed., Lecture Notes in Computer Science 19: Springer-Verlag, Berlin, Heidelberg, New York, 1984. Also published as MIT/LCS/TM-61, May 1975.
18. Dennis, J.B. Data Flow Supercomputers. Computer 13, 11 Nov. 1980.
19. Dennis, J.B. An Operational Semantics for a Language With Early Completion Data Structures. *Informal Description of Programming Concepts,* Berlin, Heidelberg, New York: Springer-Verlag, 1981. Also published as CSG Memo 207, Feb. 1981.
20. Dennis, J.B., Gao, G.R., and Todd, K.R. *A Data Flow Supercomputer.* CSG Memo 213, Mar. 1982.
21. Dennis, J.B. and Misunas, D.P. A Preliminary Architecture for a Basic Data Flow Computer. *Proc. of the Second Ann. Symp. on Computer Architecture,* IEEE, 1975. Also published as CSG Memo 102, Aug. 1974.
22. Dennis, J.B., Stoy, J.E., and Guharoy, B. VIM: An Experimental Multi-User System Supporting Functional Programming. CSG Memo 238, Apr. 1984.
23. Douglas, J., Jr., and Gunn, J.E., A General Formulation of Alternating Direction Methods. *Numer. Math.* 4 (1964), 428.

24. Fosseen, J.B., *Representation of Algorithms by Maximally Parallel Schemata*. Master Th., Dept. of Electrical Engineering and Computer Science, MIT, Jun. 1972.

25. Gao, G-R. *An Implementation Scheme for Array of Operations in Static Data Flow Computers*. LCS, Master's thesis, Department of Electrical Engineering and Computer Science, MIT, Cambridge, Mass. Jun. 1982.

26. Gao, G-R, *A Maximally Pipelined Tridiagonal Linear Equation Solver*. CGS Memo 254, Aug. 1985.

27. Gurd, J.R., C.C. Kirkham, and I. Watson, The Manchester Dataflow Prototype Computer. *Communications of the ACM* 28, Jan. 1985, 34-52.

28. Kahn, G., The Semantics of a Simple Language for Parallel Programming. Information Processing 74: Proceedings of the IFIP Congress 74, 1974, pp. 471-475.

29. Karp, R.M., and Miller, R.E., Properties of a model for parallel computations: determinacy, termination and queueing. SIAM *J. Appl. Math.* 14, Nov. 1966.

30. Kogge, P.M., *The Architecture of Pipelined Computers*, McGraw-Hill, New York, NY 1981.

31. McGraw, J., *Data Flow Computing--The Val Language*. Computation Structures Group Memo 188, Jan. 1980.

32. Montz, L. *Safety and Optimization Transformations for Data Flow Programs*. MIT/LCS/TR-240, LCS. Master's thesis, Department of Electrical Engineering and Computer Science, MIT, Cambridge, MA, Jun. 1980.

33. NEC Electronics, Inc., *Advanced Product Information User's Manual: PD7281 Image Pipelined Processor*. Mountain View, CA, 1985

34. Patil, S.S. Closure Properties of Interconnections of Determinate Systems. Record of the Project MAC Conference on Concurrent Systems and Parallel Computation, ACM, New York, NY, 1970.

35. Peterson, J.L., *Petri Net Theory and the Modeling of Systems*. Prentice-Hall., Englewood Cliffs, NJ, 1981.

36. Pulliam, T.H. and Steger, J.L. On Implicit Finite-Difference Simulations of Three Dimensional Flow. American Institute of Aeronautics and Astronautics, Jan. 1978.

37. Ramchandani, C., On The Computation Rate of Asynchronous Computation Systems, Proc. of the Seventh Ann. Princeton Conf. on Information Sciences and Systems, 1973.

38. Rodriguez, J.E., *A Graph Model For Parallel Computation*. Ph.D. Th., MIT, September 1969.

39. Van Horn, E., *Computer Design for Asynchronously Reproducible Multiprocessing*, MAC/TR-34, Project MAC, MIT Nov. 1966.

40. Vedder, R., Campbell, M., and Tucker, G., The Hughes Data Flow Multiprocessor. Proceedings of the 5th International Conference on Distributed Computing systems, Denver CO, 1985, pp. 2-9.

41. Watson I. and J. Gurd, A Practical Data Flow Computer. *Computer* 15, 2, Feb. 1982, 51-57.

42. Wetherell, C.S., Error Data Values in the Data-Flow Language VAL. Transactions on Programming Languages and Systems 4, 2, Apr. 1982, 226-238.

43. Yuba, T., T. Shimada, K. Hiraki, and H. Kashiwagi. Sigma-1: A Dataflow Computer For Scientific Computation. Electronical Laboratory, 1-1-4 Umesono, Sakuramura, Niiharigun, Ibaraki 305, Japan, 1984.

44. Plas, A., Lau System Architecture: A Parallel Data-Driven Processor Based on Single Assignment. University de Toulouse, France, Aug. 1976.

45. Rumbaugh, J.E., *A Parallel Asynchronous Computer Architecture for Data Flow Programs*. MIT Thesis, Project MAC, May 1975.

46. U.S. Pat. No. 3,978,452, issued Aug. 1976, in the names of Barton, R.S., et al, for "System and Method for Concurrent and Pipeline Processing Employing a Data Driven Network."

SUMMARY OF THE INVENTION

The primary object of the present invention is to provide a novel method for efficiently implementing, in a dataflow computer comprising multiple processing elements and regional memories, computations that have been expressed in high-level language programs.

In the method of the present invention, the set of source program modules, which expresses the complete computation to be executed on the target machine, are separated into distinct data structure definitions. These definitions are used to generate machine code blocks in accordance with a strategy that prescribes: (1) a grouping of assemblages of the code blocks into successive phases of machine code execution; (2) an allocation of copies of code blocks among the processing elements for each phase of machine code computation; (3) a partitioning of the elements of each defined data structure into element groups, and an allocation of the element groups among the regional memories; and (4) a prescription for the structure of each code block, specifically the order of access and generation of data structure elements, and a choice between use of direct communication with adjacent code blocks and use of regional memory for inputs and/or results.

The method involves the translation of a set of source program modules into machine code blocks by a process including the steps of: (1) program analysis; (2) strategy; and (3) code construction. The original or intermediate source code is processed into a program description tree having program description parameters. This tree corresponds to a hierarchical set of data structure definitions. The analysis step includes traversing the program description tree to generate a program attribute tree having program attribute parameters. The strategy step includes operating on the program attribute parameters and certain machine attribute parameters to produce a mapping strategy tree having mapping parameters. The construction step includes operating on the mapping strategy parameters and the program description tree to produce a distribution of machine code blocks, assemblages of which correspond to distributed phases of the computation.

Specifically, the present invention contemplates a method for running a program in a digital computer, the program having a set of higher level code blocks defining a set of data structure values, the higher level code blocks and the data structure values being in correspondence, the higher level code blocks and the data structure values having identified data dependencies in the program, each of data structure values having a set of identified components, the digital computer having a set of processing elements, the method comprising the steps of: (a) constructing a set of machine code blocks in correspondence with the set of higher level code blocks; (b) associating at least one replication of each of the machine code blocks with at least one of the identified components of each of the data structure values; and (c) effecting executions of the replications in the processing elements in a succession of phases, (d) the succession of phases being in accordance with the identified data dependencies.

Specifically also the present invention contemplates a computation means comprising a compiler and an interpreter for translating and executing a digital program on a digital computer, the program having a set of higher level code blocks defining a set of data structure values, the higher level code blocks and the data structure values, the higher level code blocks and the data structure values being in correspondence, the higher level code blocks and the data structure values having identified data dependencies in the program, each of the data structure values having a set of identified components, the digital computer having a set of processing elements, the compiler including (a) means for constructing a set of machine code blocks inc correspondence with the set of higher level code blocks (b) means for associating at least one replication of each of the machine code blocks with at least one of the identified components of each of the data structure values, the interpreter including (c) means for effecting executions of the replications in the processing elements in a succession of phases and (d) means for causing the succession of phases to be in accordance with the identified data dependencies.

Other objects will in part be obvious and will in part appear hereinafter.

BRIEF DESCRIPTION OF THE DRAWINGS

For a fuller understanding of the nature and objects of the present invention, reference is made to the following description, which is to be taken in connection with the accompanying drawings wherein.

FIG. 3 illustrates certain dataflow programming principles in terms of Val, a functional programming language;

FIG. 8 illustrates a data smoothing function written in the Val programming language utilizing Smooth for one physical quantity and one direction of processing;

FIG. 10 illustrates a description tree for Smooth using a subrange node;

FIG. 13 is a program that illustrates the top level of an aerodynamic simulation code called AeroSim;

FIG. 14 dataflow diagram for AeroSim;

FIG. 15 is a dataflow program for the main iteration body;

FIG. 17 illustrates the XPass module written in Val;

FIG. 19 illustrates a summary of the results of program analysis;

DESCRIPTION OF THE PREFERRED EMBODIMENT

A. Overview

Figure 1A:
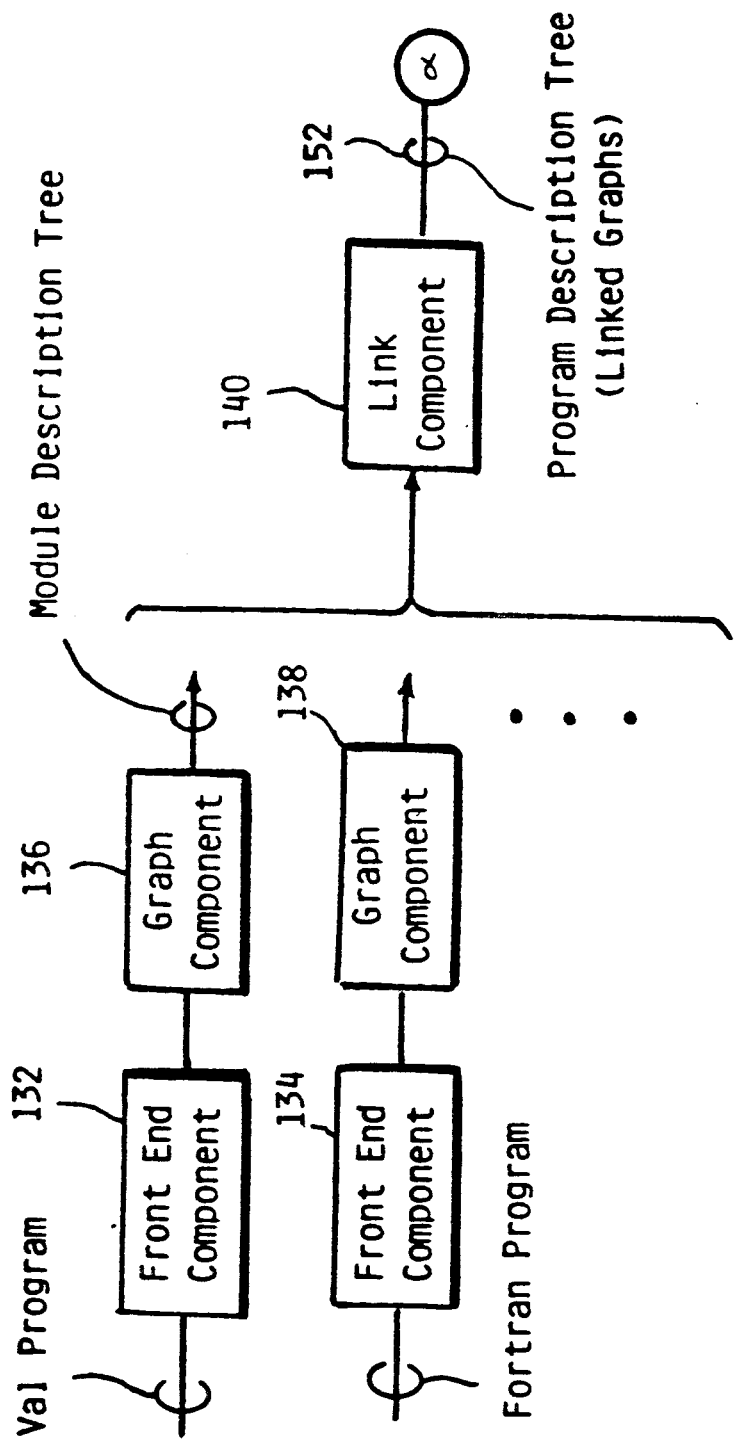
FIGS. 1A and 1B illustrate the components of a compiler for producing the machine code blocks of the present invention.
Figure 1B:
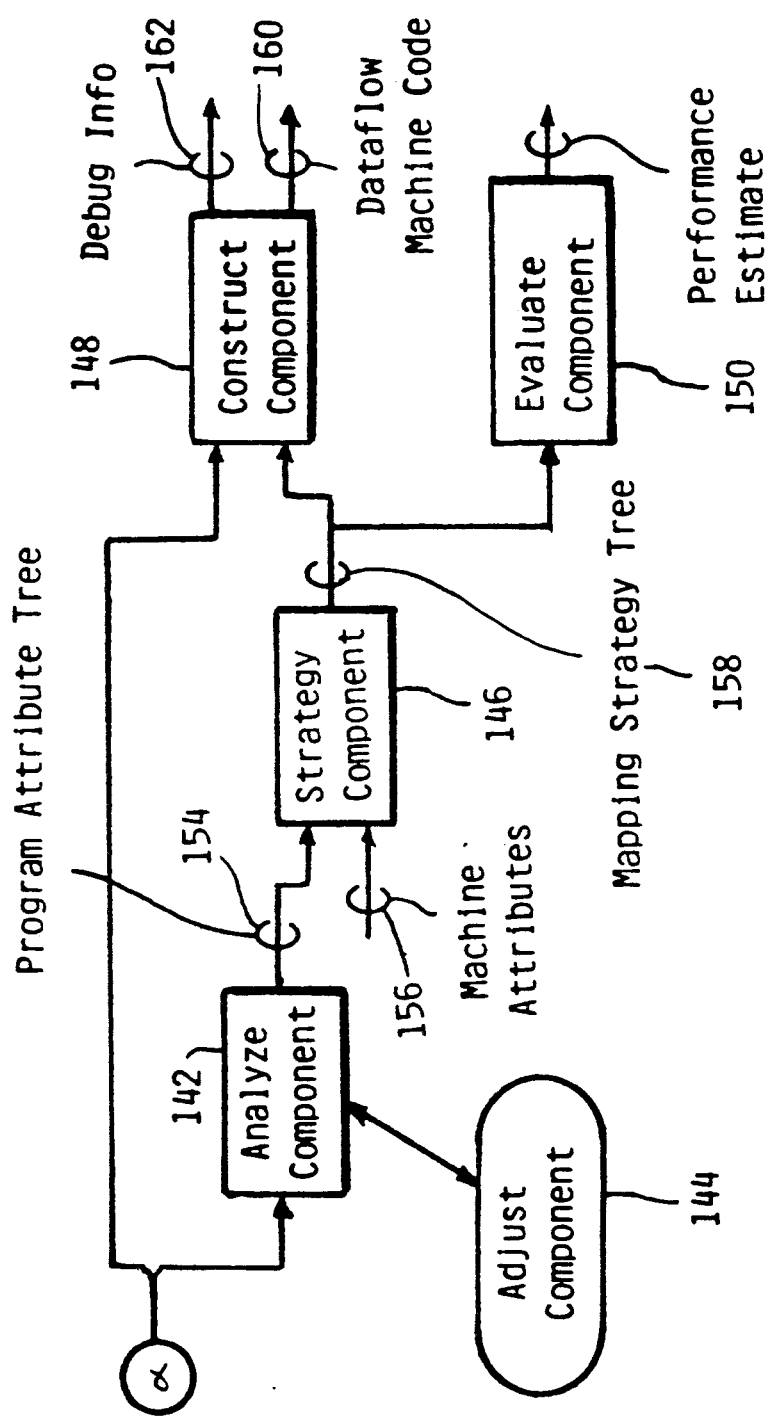
Figure 2:
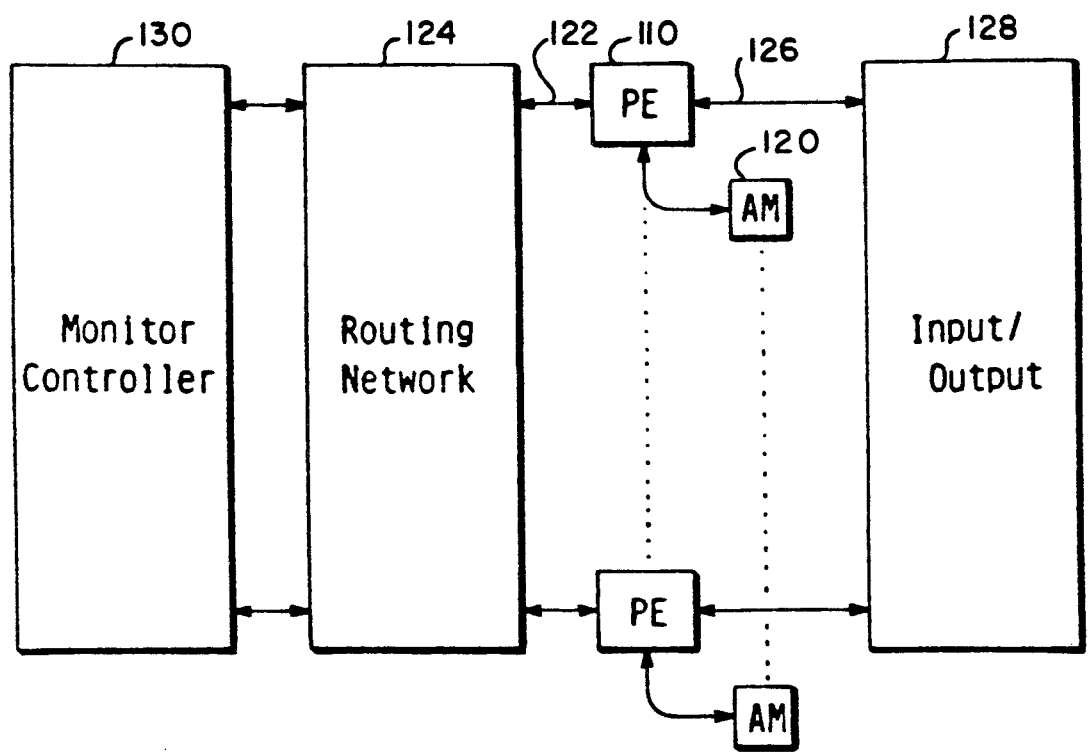
FIG. 2 illustrates a dataflow multiprocessor for running the phases of a partitioned machine program according to the present invention.

FIG. 1 illustrates a compiler that performs analysis, strategy and construction steps, by which the machine code blocks of the present invention are derived. FIG. 2 illustrates features of a dataflow multiprocessor on which the machine code blocks may be run. FIGS. 3 through 6 illustrate particular relationships between the machine code phases and the multiprocessor features. FIGS. 7 through 12 are presented in reference to Example I, which illustrates a process of the present invention. FIGS. 13 through 22 are presented in reference to Example II which illustrates another process of the present invention. FIG. 1 will be discussed following a review of the principles illustrated in FIGS. 2 through 6.

As was described more generally above, the illustrated embodiment of the present invention involves a method of running a machine code program in a computer, the machine code program containing one or more machine code blocks and corresponding to a preliminary higher level program.

The computer comprises: a plurality of memory means for storing (1) given machine code instructions having predecessor and successor machine code instructions, and (2) machine words corresponding to data structure values declared by data structure definitions occurring in said preliminary higher level program; and a plurality of processing element means for executing said given machine code instructions, each being executed contingently on the occurrence of signals generated by the execution of certain of its predecessor and successor machine code instructions. Certain of the memory means and the processing element means are in local association with respect to each other and are remote from others of the memory means and the processing element means.

The method comprises: assigning substantial replications of the machine code blocks to certain of the memory means for execution in certain phases by certain of the processing element means; the machine code blocks being collections of the machine code instructions, the phases being distributions of substantial replications of the machine code blocks over time; the machine code blocks being in correspondence with certain of the data structure definitions; constructing assignments of groups of the machine words to local associations of memory means and processing element means, the groups of machine words representing elements of the data structure values; and operating the processing element means to execute assemblages of machine code blocks in a succession of the phases in accordance with the assignment of the groups of machine words.

B. Multiprocessors Generally - FIG. 2

Generally, a multiprocessor may be considered to have firmware memory means, random access memory means, a plurality of processing element means, externally accessible input/output means, and intercommunication means. In the multiprocessors presently considered, the hardware supports operations by which any one of a large fraction of the processing elements can communicate with any other of a large fraction of the processing elements. The random access memory means includes, in effect, a global memory means containing one or more of regional memory means, a selected association of one of the processing element means and one of the regional memory means being local with respect to each other and remote with respect to other associations of the regional memory means and the processing element means. The firmware memory means permanently records an instruction set of opcodes by which the plurality of processing elements are able to operate arithmetically and logically on operands from the global memory means to produce results in the global memory means. The number of the processing element means and the sizes of the regional memory means constitute components of a machine attribute set.

As shown in FIG. 2, this multiprocessor embodies a plurality of processing elements 110 and a plurality of array memories 120. The processing elements communicate internally via paths 122 through a routing network 124 and externally via paths 126 through an input/output network 128. In one example of a multiprocessor to which the process of the present invention is applied, the multiprocessor is controlled by a monitor controller 130. As shown. each processing element 110 is associated with a local array memory 120.

The present invention particularly applies to dataflow multiprocessors. In a dataflow multiprocessor, each processing element contains a collection of dataflow instructions, predecessor-successor pairs of instructions being related by functional dependencies, a predecessor instruction having one or more successor instructions, and a successor instruction having one or more predecessor instructions. A static dataflow multiprocessor conforming to these specifications is disclosed in U.S. Pat. application Ser. No. 885,836, filed Jul. 15, 1986 now U.S. Pat. No. 4,814,978, in the name of Jack B. Dennis for Dataflow Processing Element, Multiprocessor and Processes, the entire disclosure of which is incorporated herein by reference. It is to be understood that the present invention applies equally to other dataflow multiprocessors, in particular tagged-token and other dynamic dataflow multiprocessors.

C. Source Language

The Fortran programming language generally is used to express scientific computations for execution on conventional computers and vector pipelined supercomputers. However, Fortran programs are difficult to analyze for sections of code that can be run concurrently on the processing elements of a multiprocessor computer.

Programming languages such as Val and Id have been designed as functional languages, specifically so that program sections that can run concurrently are easily identified. In a Val program, the data structure definitions that are illustrative of the method of the present invention are distinctively manifested by the syntactic structure of the language. Therefore, it is easy to translate program modules written in Val into module description trees in which the main nodes correspond to data structure definitions.

To apply the implementation techniques of the present invention to programs in non-functional languages such as Fortran, Pascal and Lisp, it is necessary, as a preliminary step, to perform a global dataflow analysis of the complete program and to recast the expressed computation as a hierarchical set of partially ordered data structure definitions.

D. The Process of the Present Invention

The process of the present invention is characterized by (1) generation of a distribution of machine code blocks for a dataflow multiprocessor from a program description tree that represents a nested hierarchy of partially ordered data structure definitions derived from a group of high level language source program modules; and (2) execution of a computation by running the distribution of machine code blocks on a distribution of the processing elements of the dataflow multiprocessor in one or more assemblages--one or more phases.

The process of generating machine code blocks from source language program modules is performed by the compiler of FIG. 1. As shown, the compiler of FIG. 1 comprises: front end components 132, 134; graph components 136, 138; a link component 140; an analyze component 142; an adjust component 144; a strategy component 146; a construct component 148; and an evaluate component 150. The purpose of this compiler is to produce assemblages of machine code blocks for efficient execution of a program as a succession of one or more computing phases.

The process of generating machine code blocks from source programs written in Val or Fortran is illustrated in FIG. 1. The source program text is scanned and parsed by front end components 132 and 134, which checks for correct syntax, correct type, and for all other compiler detectable errors in the source program. Graph component 136 or 138 identifies the sections of the source programs that form data structure definitions and builds the corresponding module description tree. In the case of a functional language such as Val, the identification of data structure definitions is straight-forward. In the case of a non-functional language such as Fortran, the graph component must perform a global dataflow analysis of the Fortran program module to convert the code into functional form such that the independent data structure definitions can be identified. The module description tree retains all structural information in the source program module for use in later phases of operation of the compiler. The nodes of the module description tree represent source program segments of the following types: simple arithmetic expressions containing no references to data structure elements; structure expressions in the form of arithmetic expressions including array references; conditional expressions; and each of any kinds of expressions or combinations of expressions allowed by the source language to constructively define data structure values.

Link component 140 links together the module description trees from graph modules 136, 138. The result is a program description tree 152 having program description parameters with a structure in which nodes are in correspondence with segments of the source program text and denote functional relationships of results to arguments.

Analyze component 142 traverses program description tree 152 to generate a program attribute tree as at 154 having nodes that define attributes of corresponding nodes in program description tree 152. In many programs for large-scale computation, sufficient information may be extracted from the program text to determine many quantitative measures of the resources required by program parts. This information includes the dimensions of arrays and size parameters of other data structures defined by the program, the range of index values in forall expressions, the number of cycles performed by for .. iter loops, and the conditions that control evaluation of if..then..else expressions. The analyze component extracts this information from the linked set of program modules and also determines scalar operation counts for each program part to the best of it's ability.

Adjust component 144 permits a user to supply attributes to the program attribute tree 154. The analysis step will be more or less successful depending on the kind of program being processed. If information derived from the program text is not sufficient to determine a good measure of the program's resource requirements, the user can intervene via adjust component 144 to supply additional information such as the range of cycles taken by an iteration, the typical size of an array, or the frequency of selection of the alternative arms of a conditional expression.

Strategy component 146 uses information in program attribute tree 154 and machine attribute parameters as at 156 to produce a mapping strategy tree as at 158. The objective for choice of strategy is that the set of machine code blocks specified for each data structure definition of the source program should, when executed together with other parts of the target code, achieve balanced utilization of the machine's resources. Specifically, strategy component 146 determines: a partition of the collection of code blocks into phases; and for each phase and each code block, the type of constructed machine code block and the assignment of copies of the machine code block to processing elements of the target machine.

The function of construct component 148 is to build the dataflow machine code block according to the strategy provided by strategy component 146.

An evaluate component 150 uses mapping strategy tree 158 to produce a performance estimate. This estimate may be used to guide revisions to the computational algorithm, or to change information provided to the compiler by means of adjust component 144.

An important feature of any compiler is provision of information that permits users to test and correct programs by inspecting intermediate results produced during a computation. The convenience of being able to carry out this inspection in terms of source language names and constructs has become mandatory for efficient program development. To support this feature, the illustrated compiler provides debug information at 162 that relates names occurring in the initial dataflow program to the memory locations at which the associated values and code have been allocated in the machine.

E. Data Structures of the Compiling Process

The compiling process involves several data structures: (a) a form of program description tree; (2) a form of program attribute tree; and (3) a form of mapping strategy tree. The following illustrations of these data structures are based on the Val programming language and on multidimentional array values, which are a primary form of data structure in scientific computation. Allocation schemes for array values will be discussed in Section F, below.

1. Module Description Trees; Program Description Trees

A module description tree or a program description tree typically has node types as listed below. Reference is made to the Val language as representative of languages by which identification of data-structure definitions is readily accomplished.

| Type | Remarks |
| --- | --- |
| Graph | Describes an acyclic interconnection of component program elements, described by associated subtrees. |
| ForAll | Represents a Val forall expression. |
| Iteration | Represents a Val For . . . Do expression. |
| Conditional | Describes a Val conditional expression by references to subtrees for its arm and test expressions. |
| SubRange | Describes a conditional expression where the tests divide an index range into manifest subranges. |
| ArrayExp | Describes an expression containing only scalar operators and references to array elements. |
| Boolean | Describes an expression having a result of type boolean. |
| Apply | Describes an invocation of a computation defined by another module description tree. |

The difference between a module description tree and a program description tree is that a module description tree may contain Apply nodes, but a program description tree does not. The Apply nodes in module description trees are replaced by the specified module description trees by operation of link component 140.

In a program description tree, ForAll nodes and Iteration nodes represent source program sections that define scalar values or array values. The remaining node types serve to represent constituent elements of such program sections.

2. Program Attribute Tree

A program attribute tree is the result of applying the analyze process to a program description tree. The nodes of a program attribute tree are in correspondence with nodes of the program description tree. However, instead of holding complete information about the meaning of the corresponding source program phase, the program attribute tree contains only the summary data needed to determine an optimum mapping strategy. The node types and associated data are as follows:

| Type | Analysis Data |
| --- | --- |
| Graph | Describes an acyclic interconnection of component program elements, described by associated subtrees. |
| ForAll | Val forall expression. Gives the order and index ranges of its result arrays. |
| Iteration | Val for . . . iter expression. Gives the number of evaluations of its body and the order and index ranges of its result arrays. |
| Conditional | Describes a Val conditional expression by references to its arm and test expressions. |
| SubRange | Describes a conditional expression where the tests divide an index range into |

| Type | Analysis Data |
|---|---|
| | manifest subranges. |
| ArrayExp | A Val expression containing only scalar operators and references to array elements. Gives expression depth and operation counts. |
| Boolean | A Val expression having a result of type boolean. Gives expression depth and operation counts. |

3. Mapping Strategy Tree

For certain data structure definition (array definition) nodes of the program description tree, machine code blocks are constructed by the code construct module. The structure of the machine code block is prescribed by the mapping strategy. Thus, a mapping strategy represented by a mapping strategy tree having nodes in correspondence with the data structure definition nodes of a program attribute tree, has the following information for each code block: (1) The numbers of copies of the code block needed to fully utilize the processing elements of the target computer; (2) the manner of handling each data structure input and result, including form of storage and order of access and generation of array elements. In addition, the mapping strategy tree specifies how code blocks are grouped into phases of computation.

F. Array Allocation

Figure 6A:
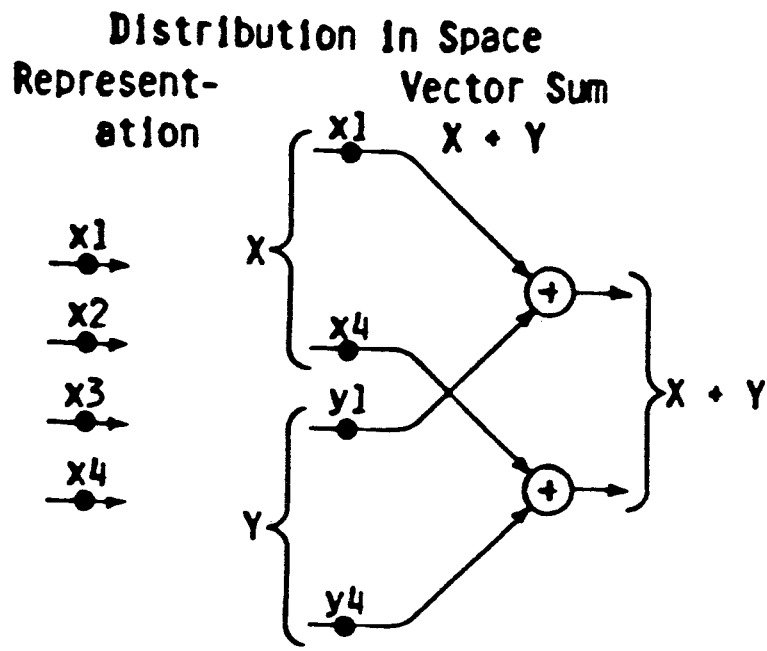
FIGS. 6a, 6b and 6c illustrate alternative representations of array values and space-time relationships in accordance with the present invention.
Figure 6B:
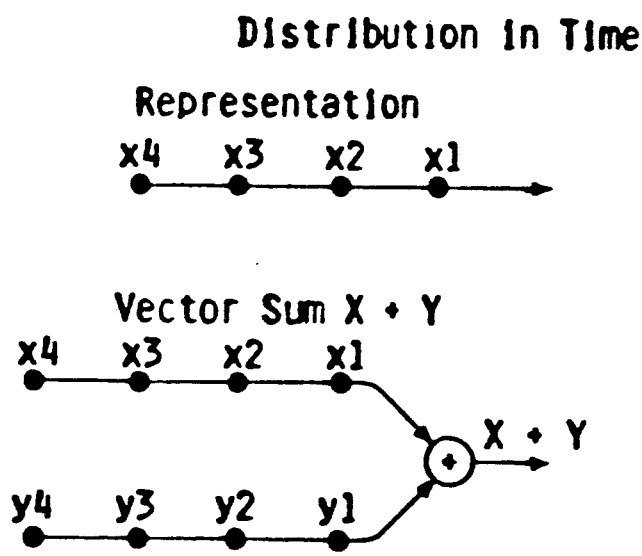

Two alternative views of array values are useful in dataflow computation, as illustrated in FIGS. 6a and 6b. In one view, an array is regarded as a set of scalar values carried simultaneously by several dataflow arcs, the array being distributed in space. In the other view, an array is regarded as a set of successive values carried by tokens traversing a single dataflow arc, the array being distributed in time. The choice between distributing in space or in time is an important element of a mapping strategy for matching parallelism in an algorithm to the parallelism supportable by the target computer. In many large scale codes, the parallelism available in the algorithm is so great that distributing most arrays in time is necessary to achieve balanced use of machine resources.

In the following discussion, machine code blocks are considered in reference to a static dataflow machine with Npe processing elements (PEs). each PE having a memory module (AM). The goal is to choose an allocation of data structure values to memory modules that yields the highest overall speed of computation. Here we illustrate preferred strategies of allocation for an important class of data structures, the multidimensional arrays of scientific computation. In this case, each code block is constructed to implement an array definition derived from the source program text.

Within the body of any iteration, the code blocks corresponding to array definitions form an acyclic directed graph in which each arc represents a link by which one code block delivers an array value to another code block. In some cases, a strategy is possible in which one code block generates array elements in the exact order required by the receiving code block. In this situation, no storage or at most a small FIFO (first in-first out) queue is needed to hold the array elements. If this arrangement is not possible, it is necessary to store the array value in the global memory, which comprises the individual array memory modules associated with the processing elements. The illustrated embodiment of the present invention envisions two strategies for allocating large array values among the regional memories associated with processing elements: (1) truncation of the dimension list, and (2) uniform subcubes. These strategies are defined as follows, where the dimension list of a k-dimension array value $$n[1],..., n[k]$$

and $$n[i] = High[i] - Low[i] + 1$$

is the subscript range for the ith dimension of the array value, and High[i] and Low[i] are, respectively, the high and low bounds of the subscript range for dimension i of the array.

(1) Truncation of the dimension list. First a permutation of the dimension list is chosen. Let the permuted list be be p[1],..., p[k]. Then a postfix of the list is chosen p[r],...,p[k], where r is between 1 and k, and the product of p[r], ..,p[k] is less than the capacity of an array memory module. The allocation scheme is to assign a number of (k −r +1)-dimension subcubes to each AM such that the array is evenly divided over the Npe AM modules.

(2) Uniform subcubes. Given the dimension list n[1], ..,n[k], choose numbers a[1], .. ,a[k] such that the product of q[i], $1 \leq i \leq k$, is greater than or equal to Npe, where q[i]=n[i]/a[i]. The strategy is to allocate some number of k-dimension cubes to each PE.

Each of these allocation schemes defines an addressing rule by which a processing element accesses or stores an array element allocated to a nonlocal memory module.

Figure 6C:
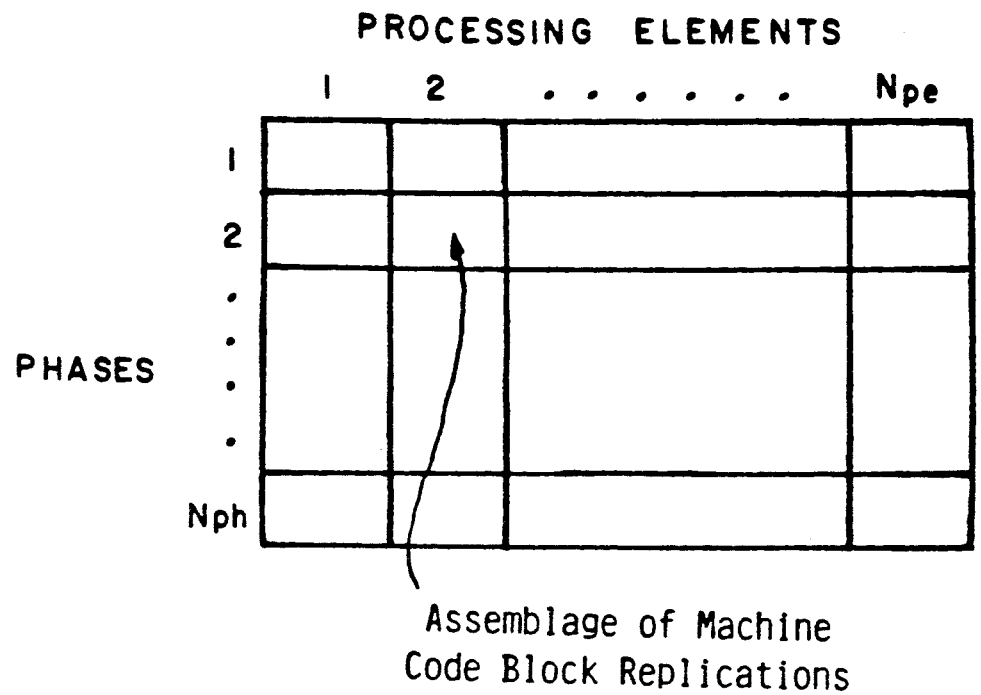
Figure 7:
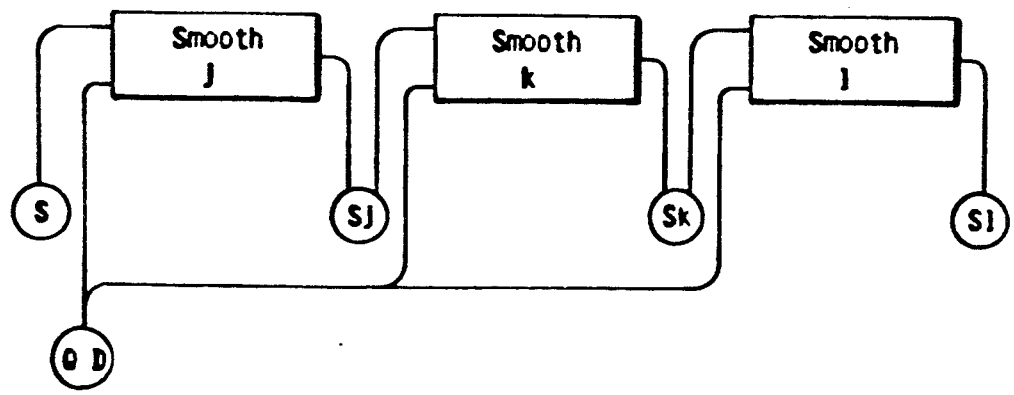
FIG. 7 illustrates the phases of a smoothing function called Smooth in connection with the use of array memories in accordance with the present invention.

The strategy module selects an array allocation scheme for each arc linking two code blocks. That strategy is chosen which yields the best overall performance on the target machine. Best performance is defined to be the smallest execution time on the target machine, while meeting all constraints imposed by memory size limits and the number of processing elements, and considering delays caused by interprocessor communication due to nonlocal array element references and the possible splitting of code blocks among more than one processing element. The resulting time-space relationship is shown in FIG. 6c.

G. Dataflow Execution

Dataflow computers are based on dataflow program graphs as their model of computation. To illustrate this model, consider the well known quadratic formula for the roots of a second order algebraic equation with real coefficients $$az^2 + bz + c = 0$$

The complex roots of the quadratic are given by $$z = \frac{-b \pm \sqrt{b^2 - 4ac}}{2a}$$

A program expressed in Val to compute the two complex root values is shown in FIG. 3. Note that the complex values are represented by a user defined record type having fields for the real and imaginary components. A dataflow graph for this computation is given in FIG. 4. This graph consists of nodes (or actors) 100 connected by arcs (or links) 102, with tokens (or packets) 104 being carried by the arcs and being consumed by the nodes to indicate the flow of information from predecessor nodes to successor nodes. Although the terms "tokens" and "packets" are sometimes used interchangeably, "tokens" is used in discussing the abstract dataflow model, and "packets" is used in discussing implementations of the model. The nodes respond to the presence of tokens on their input arcs by "firing"- applying nodes to ready (entry) tokens on input arcs to produce result (derived) tokens on output arcs. Because a node can fire whenever it has ready tokens on its input arcs and token-free output arcs, dataflow graphs can be configured in stages in the same manner as conventional pipelined functional units. In the static dataflow design of the present embodiment, an arc may carry no more than one token. The significance of the dataflow model regarding the present invention is that the nodes correspond to instructions, the arcs to functional dependencies between the instructions in pairs, and the tokens to information generated by predecessor instructions for processing by successor instructions.

Figure 4:
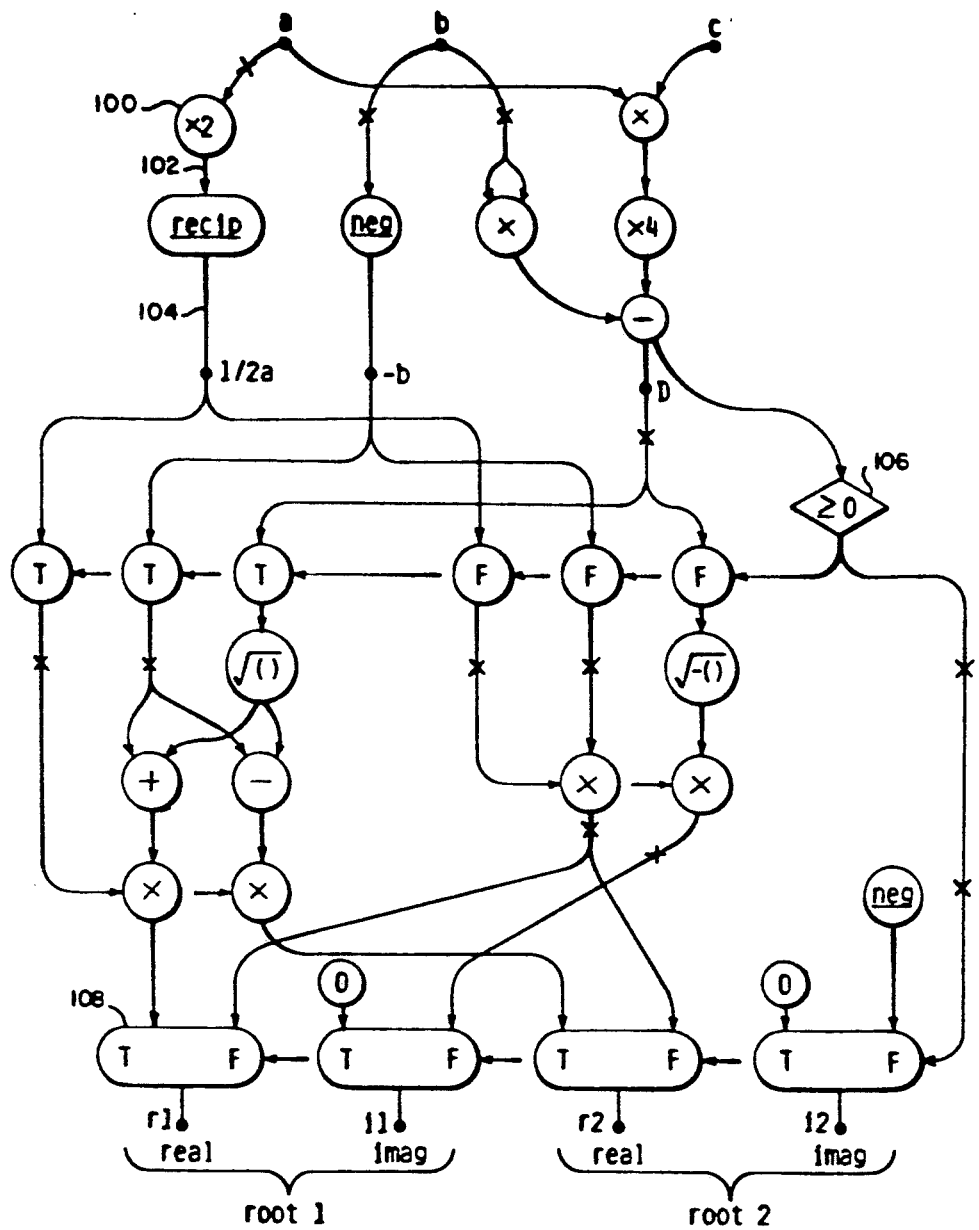
FIG. 4 dataflow graph principles that correspond to the programming principles of FIG. 3.
Figure 5:
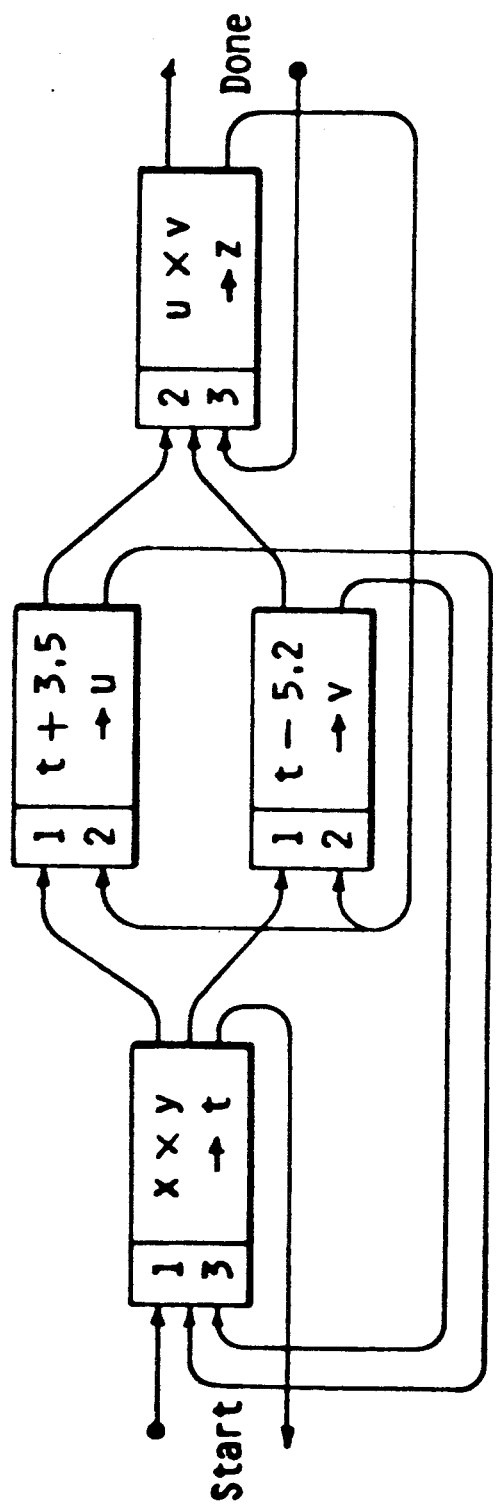
FIG. 5 illustrates dataflow instructions arranged for pipelined execution in accordance with the present invention.

As shown in FIG. 4, self-explanatory nodes that represent constants and arithmetic operators are shown as circles with such labels as $\times 2$, recip, neg, $\times$, $\times 4$, $-$, T, F, V(), +, and 0. The diamond shaped node 106 with the label $\geq 0$ is a decider that performs a test on its data input and sends the resulting boolean truth value to its successors. The circular nodes inscribed with T or F are gates that pass a data value if and only if the boolean control input matches the label. At the bottom of the graph are four merge nodes, shown as capsules 108 labelled T F which pass one value from the specified data input for each boolean token received. Except for the merge node, all nodes behave according to the same simple firing rule: a node is enabled if and only if a token is present on each of its input arcs and there is no token on any of its output arcs. The merge node is special; it is enabled only when a boolean token is present and a data token is present at the input corresponding to the truth value carried by the boolean token (the output arc must be empty). Although examples of program graphs and their Val language equivalents are given herein for completeness, it is not necessary to follow these examples in detail in order to understand the process that is the primary subject of this disclosure.

It can be shown that graphs of the illustrated type exhibit the behavior necessary for generating one set of output data derived for each set of input data entered. Furthermore, the final configuration of tokens in the graph and the values they represent is independent of the order in which enabled nodes are fired. This property, which is called determinacy, makes it possible for a functional programming language such as Val to express parallelism without suffering from the timing hazards and races that make the development and debugging of conventional multiprocessor programs very challenging.

H. Operation - Examples of Program Mapping According to the Present Invention A process of the present invention now will be illustrated by two examples in connection with FIGS. 8 through 23. In Example I, we show how a specific program section is analyzed and a corresponding dataflow machine code block is constructed. Then we discuss in Example II an illustrative scientific computation and show how a well-chosen mapping strategy yields high performance on a dataflow multiprocessor.

Example I

Here we use a program module called Smooth to illustrate how analyzer module 142 specifies the construction of appropriate dataflow machine code. The first step is to construct description tree 152, which contains all information about the sub-program that will be used in determining the strategy.

It is convenient to express the analysis data as ranges of values written such as [4..8], and to use problem parameters of the program text such as the parameter n in specifying the size of the data arrays in the Smooth module. Such parameters are usually integer variables and the analyzer can easily identify those that derive from program inputs and are therefore appropriate parameters for expressing the results of analysis. Of course, the formulation of program construction strategy cannot be completed and machine code construction cannot be done until any such parameters have been assigned numerical values.

Figure 9:
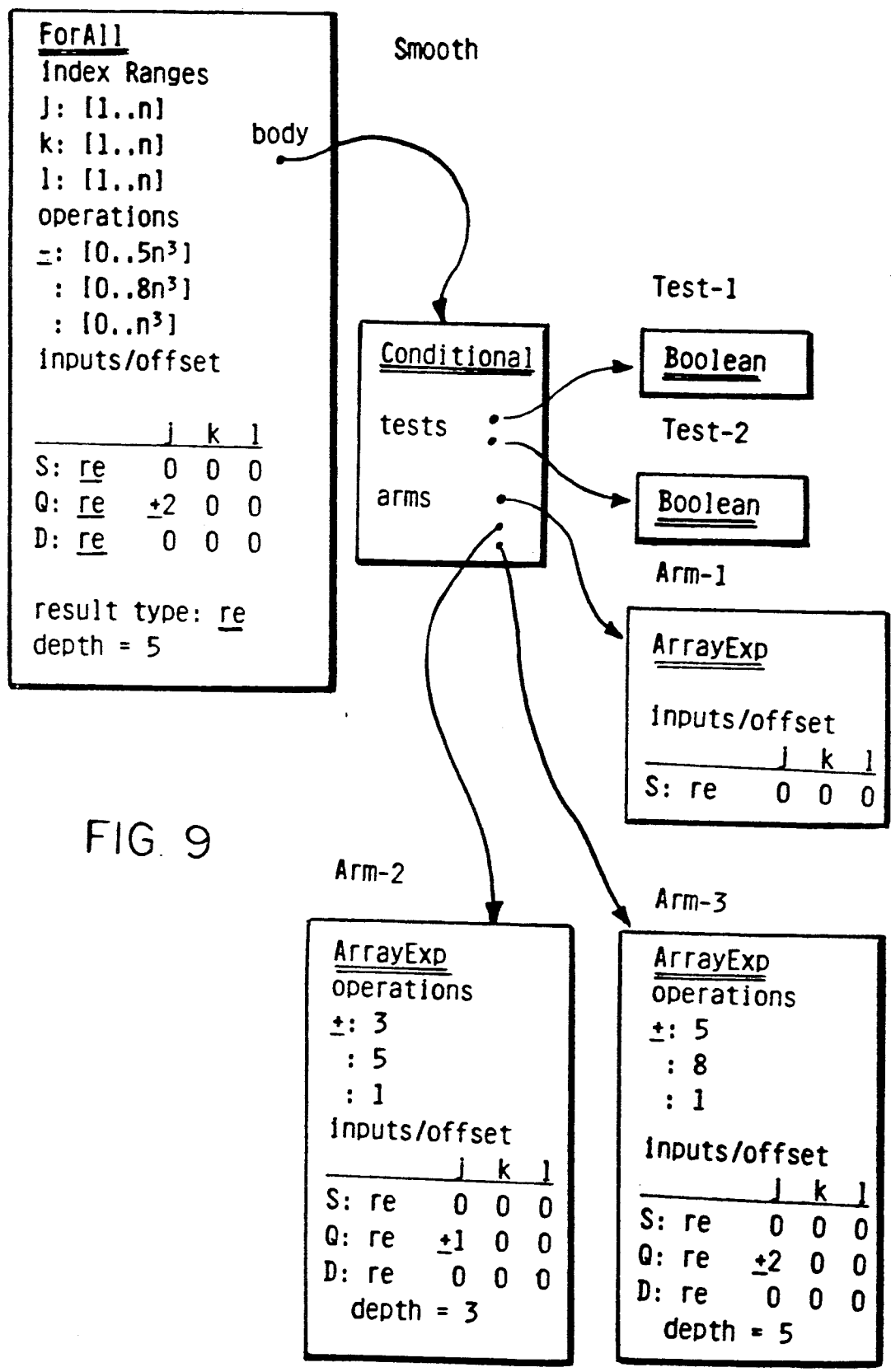
FIG. 9 illustrates a description tree for Smooth.

FIG. 8 illustrates the phases of a Smooth code block and FIG. 9 illustrates the code block itself written in Val. FIG. 10 shows the description tree for the Smooth code block. The top level node describes the forall expression. It gives the index ranges for the three-dimensional result array derived from the forall header, and has a link to the description tree node for its body. The body is a conditional expression and its description tree node simply refers to the subtrees that describe the two tests and three arms that make up the conditions. The two tests are simple boolean expressions. The description node for each of the arm expressions gives operation counts and a characterization of all references to input arrays. In this example the index offset is zero for all references except those to array Q for index j. By "offset" we mean the difference between the index value used to access an input array and the index value of the element of the output array being computed. The description indicates that Arm-2 accesses Q with j-indexes between $j-1$ and $j+1$ and that Arm-3 uses j-indexes between $j-2$ and $j+2$. The information about offset indexing of the input arrays is summarized in the top level node. This node also shows the best that can be said about the operation counts without knowledge of how the tests in the conditional expression turn out. The extremes correspond to the case that Arm-1 is always selected and that Arm-3 is always selected.

Note that the conditional arms are selected by known subranges of the integers. This allows a more informative representation of the conditional by a special type of node called a subrange node. Using this device the description tree for Smooth becomes that shown in FIG. 11. Each line in the "arm subrange" list specifies a combination of index ranges (* means no restriction,[..]- gives a sequence and indicates a set) for which the indicated arm is chosen. Since several lines may specify the same arm, the definable index sets for an arm include any finite union or rectangular subarrays of a multidimensional array. The nodes describing the arms are just as before.

This information is sufficient to compute the exact number of operations performed in an execution of Smooth.

| Arm | Adds | Multiplies | Divides | Evaluation Count |
|---|---|---|---|---|
| Arm-1 | 0 | 0 | 0 | $n^3 - (n-2)^3$ |
| Arm-2 | 3 | 5 | 1 | $2(n-2)^2$ |
| Arm-3 | 5 | 8 | 1 | $(n-2)(n-2)(n-4)$ |

Figure 11A:
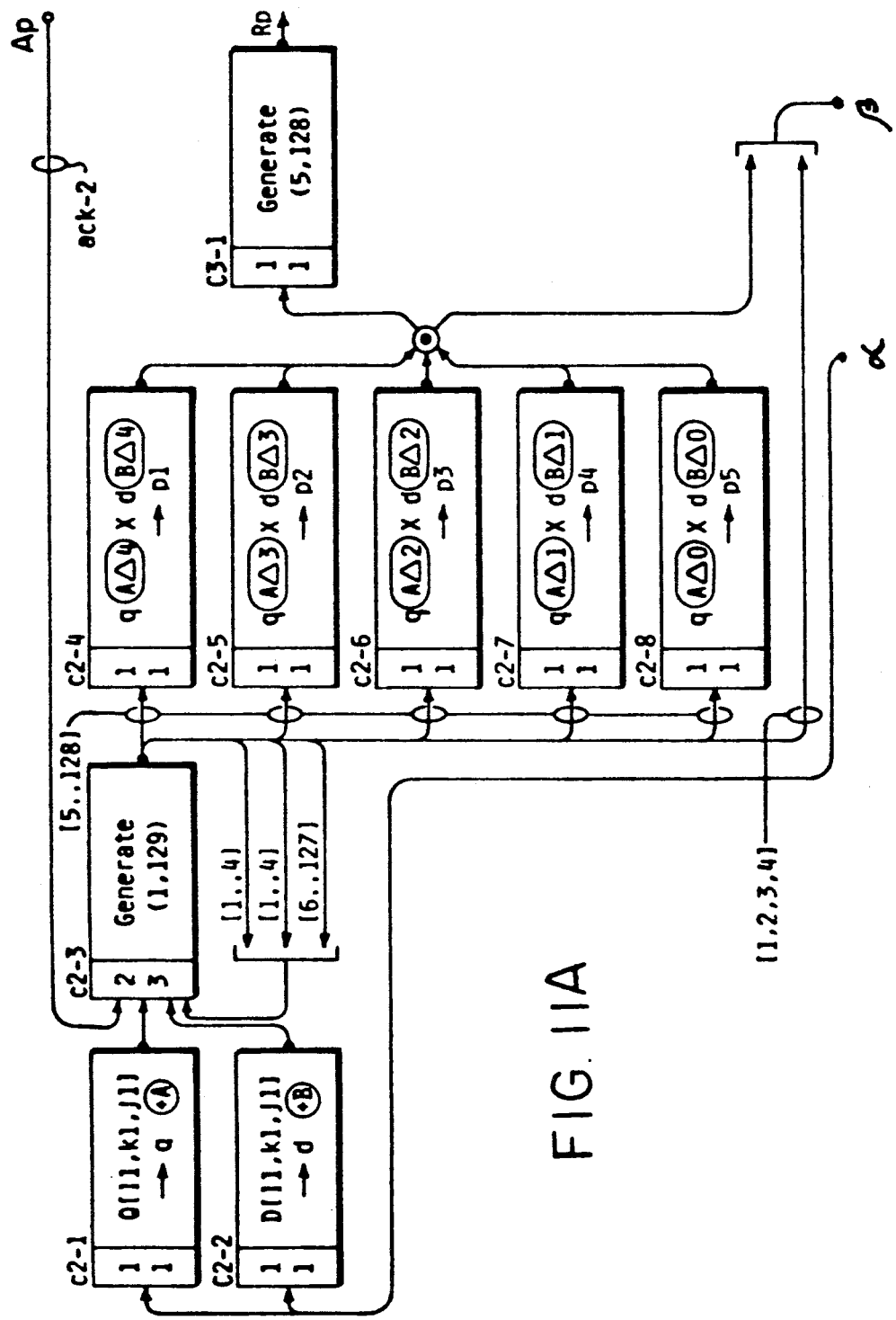
FIGS. 11A, 11B and 12 illustrate dataflow machine code for the smoothing function of FIG. 9.
Figure 11B:
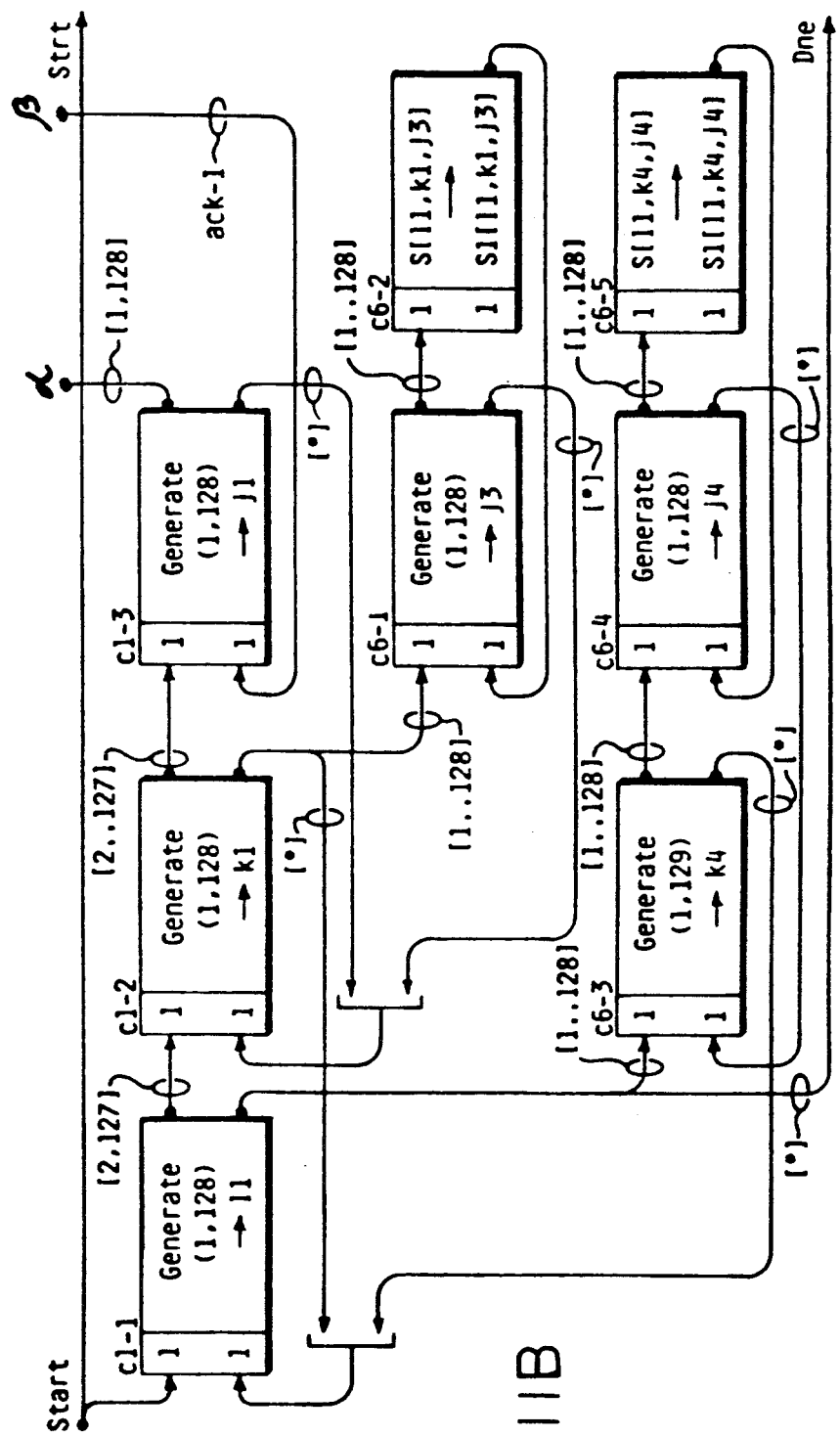
Figure 12:
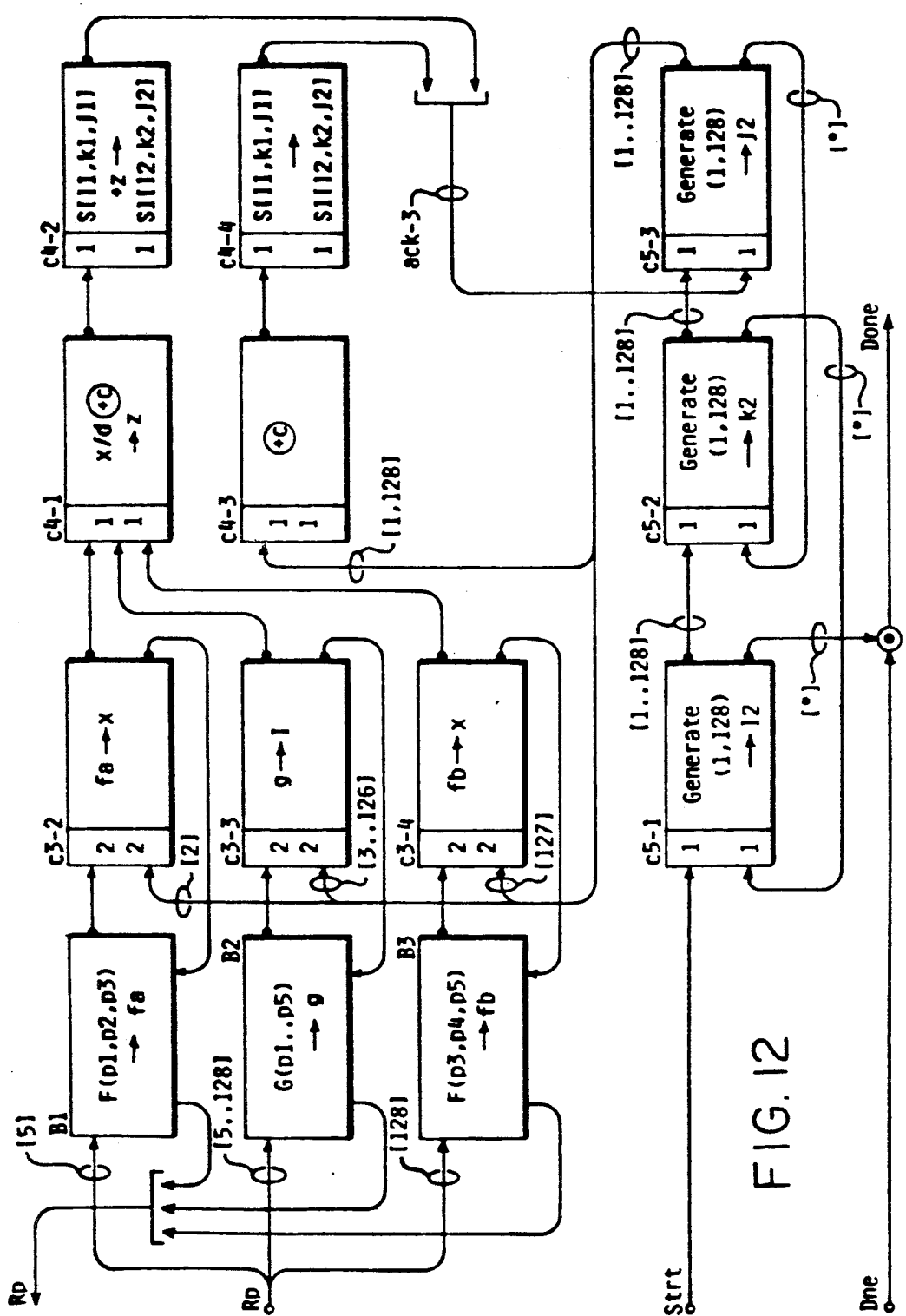

In this example, no interaction with the user is needed to obtain a complete analysis because all needed information is available from the program text. This is likely to be true for many complete programs for scientific computation. The detailed coding of a machine code block for the Smooth function is shown in FIGS. 11 and 12. A detailed explanation of this code is given in the aforementioned U.S. Pat. application Ser. No. 885,836, filed Jul. 15, 1986.

The next steps constitute strategy formulation. It is evident that each of the three arms of the conditional are readily pipelined with a small requirement for buffer storage because the offsets of the input array indices are small and fixed. If the parameter n is given as 100, as in the benchmark computation, it is evident that the $100 \times 100 \times 100 \times 5$ result array must be stored in array memory. Since the second sweep of smoothing accesses the data in a different sequence, the two sweeps cannot communicate as a pipelined producer/consumer pair and each must run as a separate phase of the computation.

Example II

The program AeorSim applies the alternating direction method to the governing equations for a compressible fluid. It uses a mapping function from the cubical computational grid to the physical space such that the boundary surface of the body under study corresponds to the (l = 1) face of the computational grid. The overall structure of the program is displayed in FIGS. 14 through 23. The diagrams show the flow of information among the major submodules and indicate the types and amounts of data passed between modules as large arrays.

The main program code block, as shown in FIGS. 14 and 15, generate the initial grid and data arrays and computes the Jacobian of the grid. This is followed by the main iteration in which the Step module is called p times to carry out the alternating direction method. Finally, the data, which has been scaled by the Jacobian to simplify the computation, is unscaled for interpretation.

Figure 16:
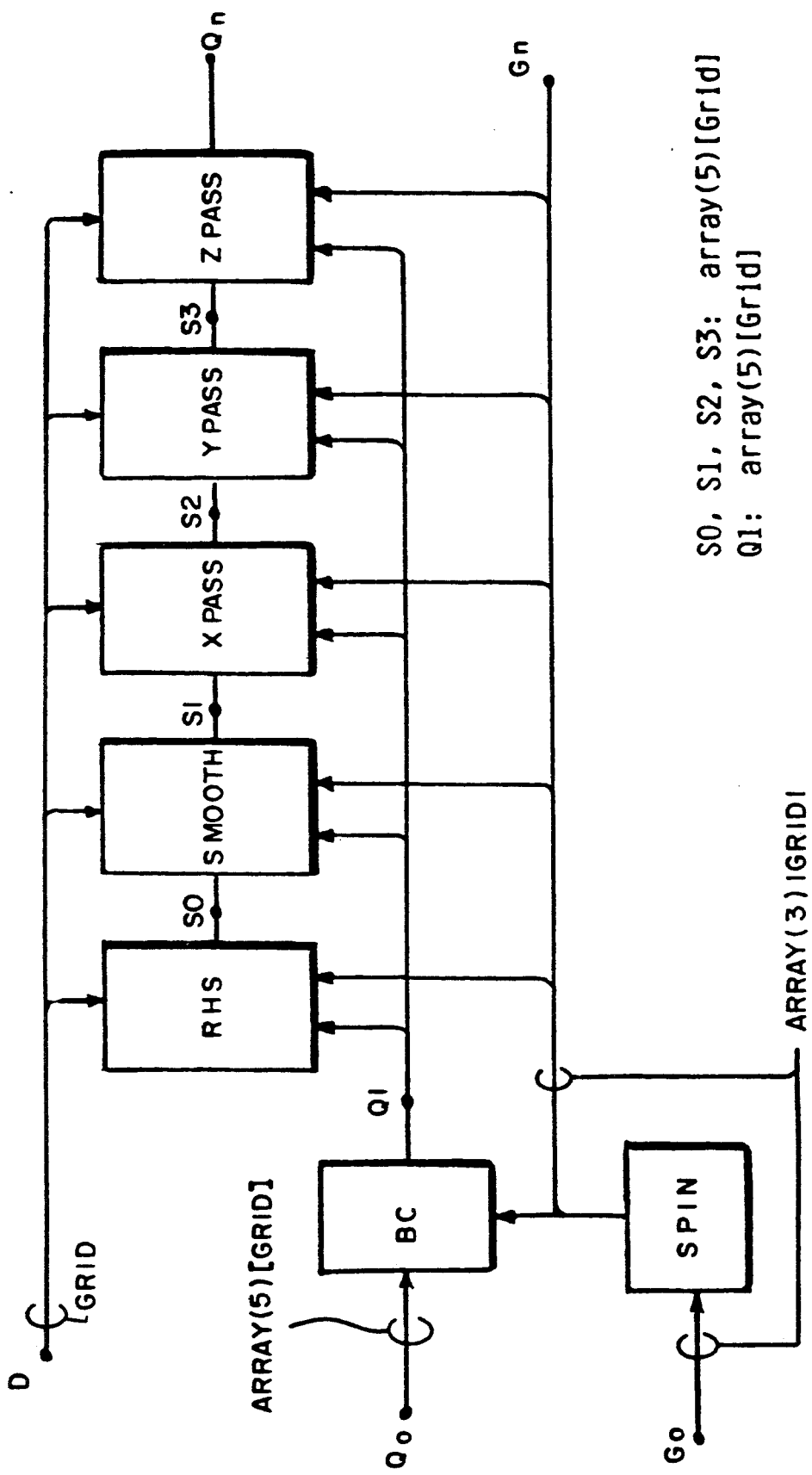
FIG. 16 is a dataflow diagram for the main iteration body.

The Step module of FIGS. 16 and 17 computes a modified grid array that reflects rotation of the body, and a new data array of physical data which is the result of advancing the solution one time step. Within the body of Step, module BC fills in the faces of the current data array with values satisfying the desired boundary conditions. Module RHS calculates the right hand side arrays of the linear systems to be solved. The Smooth module, analyzed earlier, is used to permit use of a larger time increment while ensuring stability of the computational algorithm. Modules XPass, YPass and ZPass solve the three sets of linear systems corresponding to the three spatial dimensions of the grid; they are responsible for the bulk of the computation.

Figure 18:
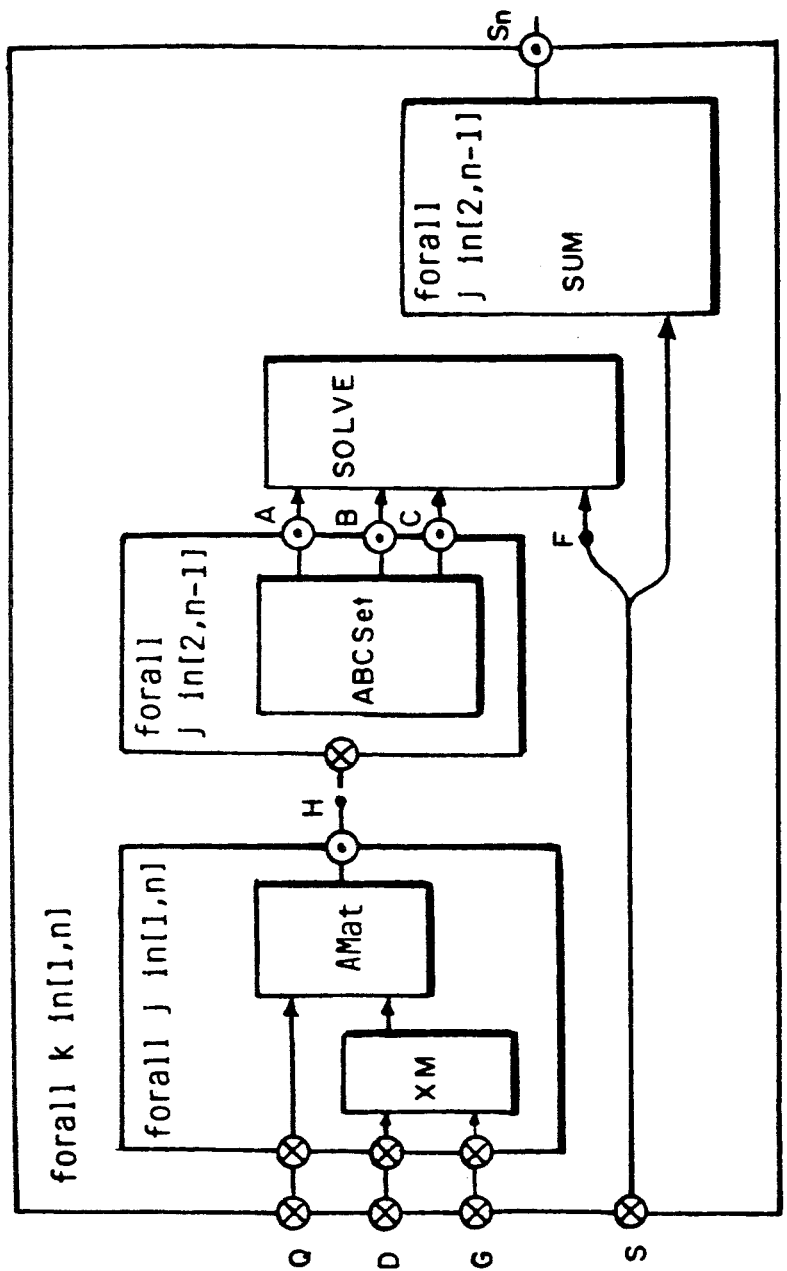
FIG. 18 illustrates is a dataflow diagram for the XPass module.
Figure 20:
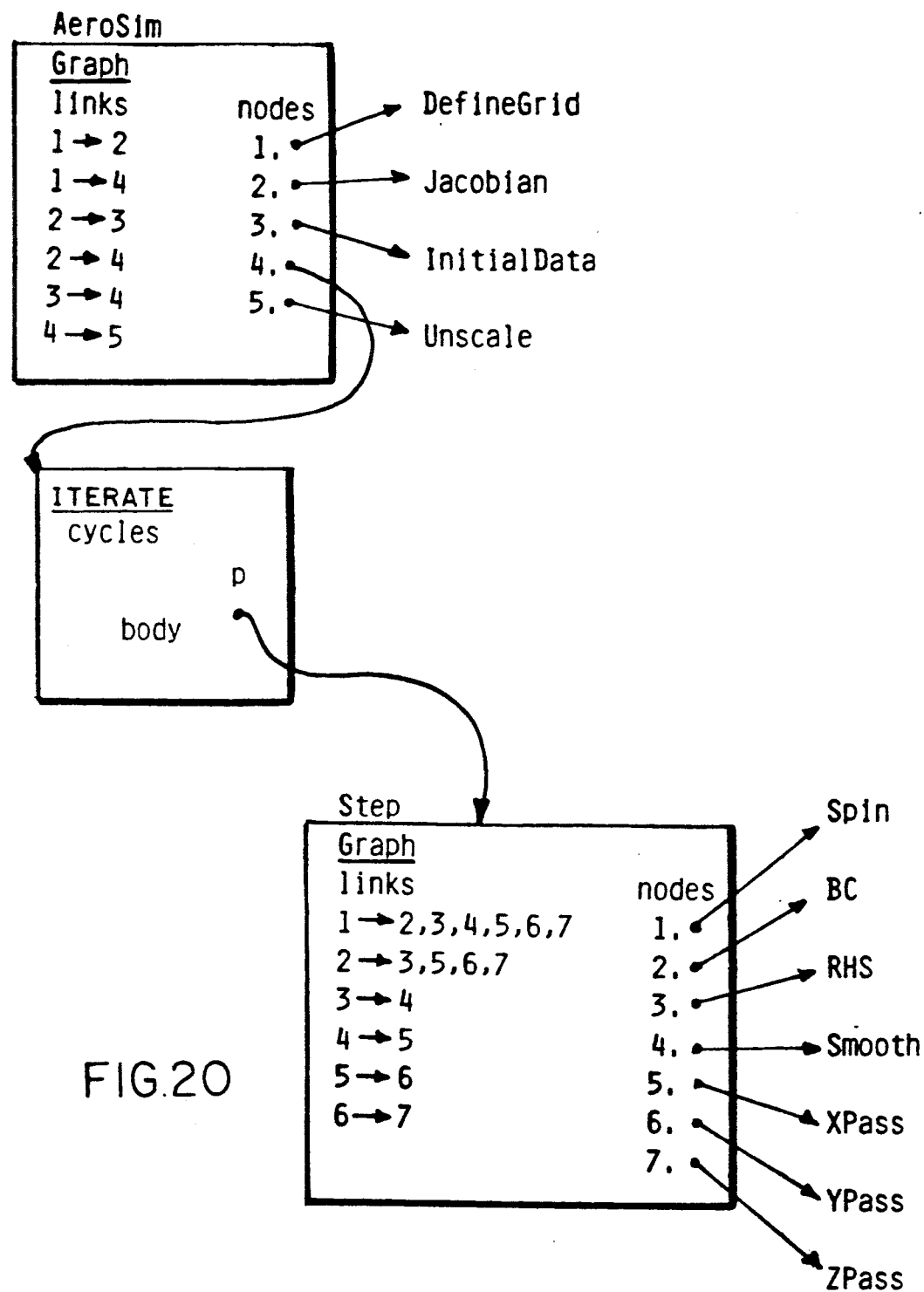
FIG. 20 illustrates top levels of the description tree for AeroSim.

The XPass module is expanded in FIGS. 18 and 19. Modules XM, AMat and ABCSet compute the coefficient matrices for a set of block tridiagonal equation systems which are solved by a module called Solve, details of which are omitted for simplicity. One block tridiagonal system is set up and solved for each combination of indices k and l.

Figures 21, 22:
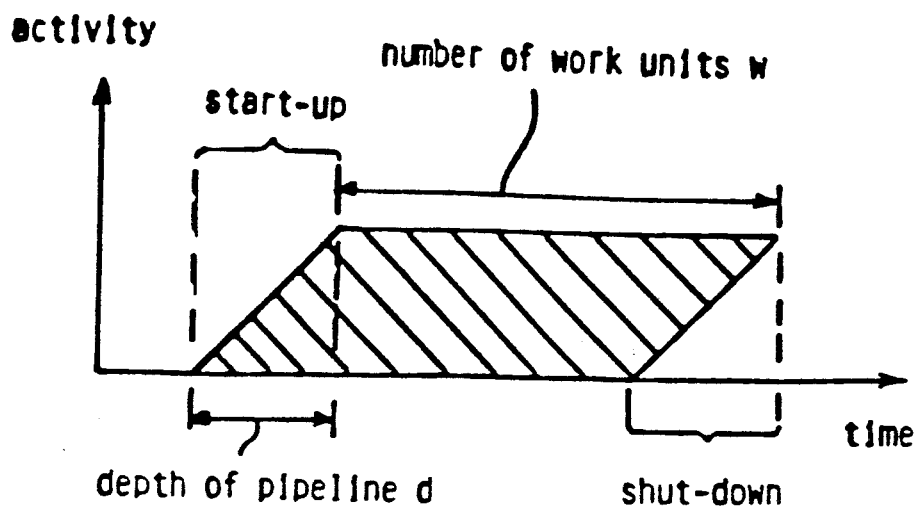
FIG. 21 illustrates start-up and shut-down of a pipeline and its effect on performance.
FIG. 22 illustrates pipeline efficiencies of the components for a module called Step.

FIG. 21 shows the results of program analysis as the top levels of a program description tree for AeroSim. The analysis data is expressed in terms of program input parameters n and p which define the size of the computational grid and the number of steps to be performed. A complete analysis of the various program modules yields the summary in FIG. 20, which gives operation counts, depth of pipelined code, and the sizes of the arrays generated by each module.

The next step is to determine how the computation will be split into phases. Since it is evident that practically all of the computation is done by the main iteration, the resource requirements of the Step module must be considered primary. Each component of the Step module in FIG. 17 generates a large array of new data, so large (for n = 100) that it cannot be held in the data memory of the processing elements. If these arrays could be generated in the same sequence that they would be consumed by successor modules, the use of array memory might be avoided. Since this is not the case for the arrays generated by the components of Step, each module must write its result array into the array memory of the machine. This applies to arrays Gn, Q1, Q3 and S0, .. ,S3. It follows that each module in FIG. 17 must belong to a separate phase of computation and must, by itself, utilize as much of the machine's processing resources as possible. We have seen how this can be done for the Smooth module. The RHS module is amenable to similar treatment and involves about the same number of dataflow instructions and pipeline depth. Modules Spin, and BC account for such a small fraction of the computation that their effect on overall performance is not material. Nevertheless, utilizing the parallelism available in the boundary condition module (BC) is essential, for otherwise this module would be an embarrassing bottleneck in the code.

Within the XPass module FIG. 18, intermodule communication is in a more fortunate pattern. Module XM can produce values as needed by AMat and AMat, in turn, generates the H array in the order required by ABCSet.

One performance issue yet to be addressed is the start-up and shut-down times of the pipelined program modules. As shown in FIG. 21 the rate of instruction execution for a pipeline ramps up as the first work unit to enter the pipe activates successive pipeline stages. The duration of this start-up period is the depth of the pipe divided by the instruction repetition rate for the pipeline. The time interval from beginning of start-up to beginning of shut-down (the time for all work units to enter the pipe) is the number of work units fed to the pipe divided by the instruction repetition rate. If the pipeline can keep its share of the machine's processing elements busy when full, then the efficiency of the pipeline is $$w/(w+d)$$

where d is the depth of the pipeline and w is the number of work units fed to it. Note that this calculation applies separately to each copy of a pipelined code module when multiple copies are required to use the full performance of the machine.

The table of FIG. 22 gives the efficiency of each component of Step. For example, the largest pipelines, XPass, YPass and ZPass, have a depth of $18 + 70 \log_2$ n=508, if the number of work units is $100^2$. Since a single copy is more than sufficient to keep the machine busy, the machine is designed to achieve 95.2 percent of full performance in executing these phases of the computation.

In the case of the Smooth module we noted earlier that it is necessary to load each processing element with four copies of the pipelined code to keep the machine fully busy once the pipes are full. The worst situation is the boundary condition computation. For most of its subcomponents the number of work units is $100^2$, but this must be distributed over all the processing elements yielding only 39 work units per copy of the code. Since pipeline depth is $105+18\log_2 n = 231$, its efficiency is only 14.4 percent.

In spite of the weakness in Module BC, overall performance of the entire AeroSim program structure is very high. If the dataflow processing elements can achieve ten megaflops of performance apiece and if the routing network and array memories support the required traffic, then the computation for one time step will run at 95 percent utilization of the processing elements. It is designed to run in 2.7 seconds at an average rate of 2,437 megaflops.

What is claimed is:

1. A method of running a machine code program in a computer, said machine code program corresponding to a preliminary higher level program and containing one or more machine code blocks;

(A) said computer comprising:
 (a) a plurality of memory means for storing (1) given machine code instructions having predecessor and successor machine code instructions, and (2) machine word corresponding to elements of data structure values declared by data structure definitions occurring in said preliminary higher level program;
 (b) a plurality of processing element means for executing said given machine code instructions, each of said machine code instructions being executed contingently on the occurrence of signals generated by the execution of selections of its predecessor and successor machine code instructions;
 (c) selections of said memory means and of said processing element means being in local association with respect to each other and being remote from other selections of said memory means and said processing element means;

(B) said method comprising:
 (a) assigning substantially alike replications of said machine code blocks to selections of said memory means for execution in selections of phases by selections of said processing element means;
 (b) said machine code blocks being collections of said machine code instructions, said phases being distributions of said replications of said machine code blocks over time;
 (c) said machine code blocks being in correspondence with selections of said data structure definitions;
 (d) constructing assignments of groups of said machine words to local associations of memory means and processing element means, said groups of machine words representing elements of said data structure values; and
 (e) operating said processing element means to execute assemblages of machine code blocks in a succession of said phases in accordance with said assignment of said groups of machine words;
 (f) said computer being characterized by machine attribute parameters, and said machine code program being derived by translation from said preliminary higher level program in a compiler that performs linking, analysis, strategy and construct steps, said preliminary higher level code being characterized by module description trees;
 (g) said linking step including traversing said preliminary higher level code to produce a program description tree having program description parameters corresponding to the parameters of said module description trees;
 (h) said analysis step including traversing said program description tree to generate a program attribute tree having program attribute parameters corresponding to said data structure definitions;
 (i) said strategy step including operating on said program attribute parameters and said machine attribute parameters to produce a mapping strategy tree having mapping strategy parameters corresponding to said data structure definitions;
 (j) said construct step including operating on said mapping strategy parameters and said program description parameters to produce said machine code blocks.

2. The method of claim 1 wherein said machine code program is a static dataflow program.

3. The method of claim 1 wherein said machine code program is a tagged token dataflow program.

4. The method of claim 1 wherein said data structure values are arrays of zero or more dimensions.

5. The method of claim 1 wherein, within the body of any iteration, the code blocks corresponding to array definitions represent an acyclic directed graph in which each arc represents a link by which one code block delivers an array value to another code block.

6. The method of claim 1 wherein said preliminary higher level program is a collection of said module description trees produced by the process of scanning, parsing, checking and transforming source program modules written in a functional language.

7. The method of claim 6 wherein said functional language is Val.

8. The method of claim 1 wherein said preliminary higher level program is a collection of said module description trees produced by the process of scanning, parsing, and checking source program modules written in a non-functional programming language, and said source program modules are converted into a hierarchical set of data structure definitions using dataflow analysis.

9. The method of claim 8 wherein said non-functional programming language is the Fortran programming language.

10. The method of claim 1 wherein said program attribute tree has parameters that characterize said data structure values by (1) size in terms of number of elements and (2) number and kind of computational operations required for their computation.

11. The method of claim 1 wherein said mapping strategy tree has mapping strategy parameters that associate with each data structure definition of the corresponding program description tree: (1) an allocation scheme and (2) orders of access and generation of data structure elements; and a partition of said data structure definition into a distribution of said executional phase.

12. The method of claim 1 wherein a computational relationship holds among said machine attribute parameters, said program attribute parameters, and said mapping strategy parameters.

13. A method for running machine code in a dataflow multiprocessor having a plurality of processing element means and a plurality of random access memory means, said method comprising the steps of:
   (a) allocating a first distribution of one or more assemblages of machine code blocks to a second distribution of one or more of said random access memory means to provide a stored dataflow machine program;
   (b) running said stored dataflow machine program on a third distribution of one or more of said processing element means through a fourth distribution of one or more phases;
   (c) selected attributes of said first distribution, said second distribution and said third distribution being characterized by dimensions of space, selected attributes of said fourth distribution being characterized by the dimension of time;
   (d) there being computational relationships among said attributes of said first distribution, said attributes of said second distribution, said attributes of said third distribution and said attributes of said fourth distribution;
   (e) said dataflow multiprocessor being characterized by machine attributes, and said stored dataflow machine program being derived by translation from a dataflow preliminary code to said dataflow machine code in a compiler that performs linking, analysis, strategy and construct steps, said dataflow preliminary code being characterized by a module description tree;
   (f) said linking step including traversing said preliminary dataflow code to produce a program description tree having program description parameters corresponding to the parameters of said module description tree;
   (g) said analysis step including traversing said program description tree to generate a program attribute tree having program attribute parameters corresponding to data structure definitions;
   (h) said strategy step including operating on said program attribute parameters and said machine attribute parameters to produce a mapping strategy tree having mapping parameters corresponding to said data structure definitions;
   (i) said construct step including operating on said mapping strategy parameters and said program description parameters to produce said distributed assemblages of machine code blocks.

14. A method for efficiently running machine code in a multiprocessor by allocation of a distribution of one or more assemblages of machine code blocks to a distribution of one or more associated memory components and processing elements for execution in a distribution of one or more phases, said multiprocessor having reference machine attribute parameters, said method comprising the steps of:
   (a) running selections of machine code blocks to accress arguments from and to store results in selections of said memory components during selections of said phases on selections of said processing elements;
   (b) there being computational relationships among the sizes of said machine code blocks in terms of numbers of bits, the sizes of said memory components in terms of numbers of locations, and the number of said processing elements;
   (c) said computational relationships being established by translation of a dataflow preliminary code to a dataflow machine code in a compiler that performs linking, analysis, strategy and construction steps, said dataflow preliminary code being characterized by a module description tree;
   (d) said linking step including traversing said module description tree to produce a program description tree having program description parameters corresponding to the parameters of said module description tree;
   (e) said analysis step including traversing said program description tree to generate a program attribute tree having program attribute parameters;
   (f) said strategy step including operating on said program attribute parameters and said reference machine attribute parameters to produce a mapping strategy tree having mapping parameters;
   (g) said construction step including operating on said mapping strategy parameters and said program description parameters to produce said distributed assemblages of machine code blocks.

15. The method of claim 14 wherein each machine code block is constructed to implement a data structure definition derived from said dataflow preliminary code.

16. The method of claim 14 wherein, within the body of any iteration, the code blocks corresponding to array definitions represent an acyclic directed graph having arcs interconnecting said machine code blocks in which each arc represents a link by which one machine code block delivers an array value to another machine code block.

17. A compiler for producing machine code for a multiprocessor for allocation of a distribution of one or more processions of machine code blocks to a distribution of a plurality of associated array memories and processing elements for parallel execution in a distribution of one or more phases, said multiprocessor having reference machine attribute parameters, said compiler comprising components for:
   (a) allocating particular machine code blocks to access inputs and store results in particular array memories during particular phases on particular processing elements;
   (b) there being computational relationships between the sizes of said machine code blocks in terms of numbers of bits, the sizes of said array memories in terms of numbers of locations, and the number of said processing elements;
   (c) said computational relationships being established by translation of a preliminary higher level code to a machine code by said compiler, said compiler comprising a linking module, an analysis module, a strategy module and a construct module;
   (d) said linking module scanning and parsing said preliminary higher level code to produce a program description tree having program description parameters corresponding to directed graphs;
   (e) said analysis module traversing said program description tree to generate a program attribute tree having program attribute parameters;
   (f) said strategy module operating on said program attribute parameters and said reference machine attribute parameters to produce a mapping strategy tree having mapping parameters;

(g) said constructed module operating on said mapping parameters and said program description parameters to produce said distributed processions of machine code blocks.

18. A method of running a machine code program in a computer, said machine code program corresponding to a functional preliminary higher level program; said computer comprising a distribution of memory means for storing machine code instructions having predecessor and successor machine code instructions, and machine words corresponding to characteristics of said preliminary higher level program; a plurality of processor means for executing said machine code instructions in reference to said machine code words, each of said machine code instructions being executed contingently on completion of the execution of a selection of its predecessor and successor machine code instructions; said method comprising:

(a) constructing machine code blocks as implementations of the computations expressed by a selection of data structure value definitions of said preliminary higher level program, said machine code blocks being combinations of given machine code instructions;

(b) combining essentially similar replications of said machine code blocks into assemblages corresponding to combinations of portions of said distribution of processor means and portions of a distribution of timed computation phases;

(c) causing the distribution of replications of any machine code block in said distribution of processor means to be in correspondence with the assignment of given machine words to said distribution of memory means, said given machine words representing said data structure value definitions associated with said machine code blocks;

(d) executing said machine code program in a timed succession of said computation phases;

(e) choosing said combination of replications of machine code blocks into assemblages and said assignment of said given machine words to said distribution of memory means to be chosen to induce high speed of computation by said machine code program in said computer.

19. A method for running a program in a digital computer, (1) said program having a set of higher level code blocks defining a set of array values, said higher level code blocks and said array values being in correspondence, (2) said higher level code blocks and said array values having identified data dependencies in said program, (3) each of said array values having a set of identified components, said set of identified components containing at least one identified component, (4) said digital computer having a set of processing elements, said set of processing elements containing at least one processing element, said method comprising the steps of:

(a) constructing a set of machine code blocks in correspondence with said set of higher level code blocks;

(b) associating at least one replication of each of said machine code blocks with at least one of said identified components of each of said array values;

(c) effecting executions of said replications in said processing elements in a succession of phases, (d) said succession of phases being in accordance with said identified data dependencies.

20. Computation means comprising compiler means and interpreter means for translating and executing a digital program on a digital computer;

(1) said program having a set of higher level code blocks defining a set of array values, said higher level code blocks and said data structure values being in correspondence, (2) said higher level code blocks and said array values having identified data dependencies in said program, (3) each of said array values having a set of identified components, said set of identified components containing at least one identified component, (4) said digital computer having a set of processing elements, said set of processing elements containing at least one processing element, said compiler means including, (a) means for constructing a set of machine code blocks in correspondence with said set of higher level code blocks, (b) means for associating at least one replication of each of said machine code blocks with at least one of said identified components of each of said array values, said interpreter means including, (c) means for effecting executions of said replications in said processing elements in a succession of phases, (d) means for causing said succession of phases to be in accordance with said identified data dependencies.

21. A computer-implemented compiler means for translating a higher level program to lower level code for execution by a digital computer, (1) said program having a set of higher level code blocks defining a set of array values, said higher level code blocks and said array values being in correspondence, (2) said higher level code blocks and said array values having data dependencies in said program, (3) each of said array values having a set of identified components, said set of identified components containing at least one identified component, (4) said digital computer having a set of processing elements, said set of processing elements containing at least one processing element, said compiler means including, (a) means for constructing a set of machine code blocks in correspondence with said set of higher level code blocks, (b) means for associating at least one replication of each of said machine code blocks with at least one of said identified components of each of said array values, said lower level code including said machine code blocks and being such as, (c) to effect executions of said replications in said processing elements in a succession of phases, and (d) to cause said succession of phases to be in accordance with said identified data dependencies.

22. A compiler for producing, from a higher level program having function modules and higher level code blocks defining data structure values, machine code blocks for execution on a multiprocessor computer comprising a plurality of associated memories and processing elements, said compiler comprising or st of computer-implemented processes including a parse module, a link module, an analyze module, a strategize module, and a construct module, wherein:
- (a) said parse module scans and parses said higher level program to produce a program description tree representing each function module of said higher level program;
- (b) said link module combines said function modules of said program into a collective program description tree representing the entirety of said higher level program to be executed on said multiprocessor;
- (c) said analyze module identifies said code blocks of said higher level program and derives associated attribute parameters describing the extent and pattern of components of said data structure values defined by said code blocks;
- (d) said strategize module constructs, for each of said higher level code blocks, a partition of the set of components of said data structure values, each subset of said partition being allocated to a selected processing element of said multiprocessor;
- (e) said construct module produces machine code blocks according to said partitions of data structure values and said higher level code blocks, as represented by said program description tree;
- (f) whereby, for each of said higher level code blocks, the machine code block allocated to a processing element generates those elements of said data structure value that belong to the partition subset assigned to said processing element.

23. The compiler of claim 22 wherein:
- (a) each of said data structure values is an array of data defined as a function that associates a data value with each n-tuple of integers in a region of Euclidian n-space denominated as the index domain;
- (b) the attribute parameters of a code block are the rank and subscript ranges of the array generated by said code block; and
- (c) the partition for a code block defined by said strategize module is a partition of said index domain of said array.

24. A method for producing, from a higher level program having function modules and higher level code blocks defining data structure values, machine code blocks for execution on a multiprocessor computer comprising a plurality of associated memories and processing elements, said method comprising the steps of:
- (a) scanning and parsing said higher level program to produce a program description tree representing each function module of said higher level program;
- (b) linking to combine said function modules of said program into a collective program description tree representing the entirety of said higher level program to be executed onto said multiprocessor;
- (c) analysing to identify said code blocks of said higher level program and to derive associated attribute parameters describing the extent and pattern of components of said data structure values defined by said code blocks;
- (d) strategizing to construct, for each of aid higher level code blocks, a partition of the set of components of said data structure values, each subset of said partition being allocated to a selected processing element of said multiprocessor;
- (e) constructing machine code blocks according to said partitions of data structure values and said higher level code blocks, as represented by said program description tree;
- (f) whereby, for each of said higher level code blocks, the machine code block allocated to a processing element generates those elements of said data structure value that belong to the partition subset assigned to said processing element.

25. The process of claim 24 wherein:
- (a) each of said data structure values is an array of data defined as a function that associates a data value with each n-tuple of integers in a region of Euclidian n-space denominated as the index domain;
- (b) the attribute parameters of a code block are the rank and subscript ranges of the array generated by said code block; and
- (c) the partition for a code block defined by said strategizing is a partition of said index domain of said array.

* * * * *